US012757076B2

(12) United States Patent
Yoo

(10) Patent No.: US 12,757,076 B2
(45) Date of Patent: Oct. 6, 2026

(54) GATEWAY APPARATUS, METHOD FOR CONTROLLING GATEWAY APPARATUS, AND HANDSHAKING SYSTEM

(71) Applicant: SAMSUNG ELECTRONICS CO., LTD., Suwon-si (KR)

(72) Inventor: Kiwon Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 18/736,937

(22) Filed: Jun. 7, 2024

(65) Prior Publication Data

US 2024/0406803 A1 Dec. 5, 2024

Related U.S. Application Data

(63) Continuation of application No. PCT/KR2024/095812, filed on May 17, 2024.

(30) Foreign Application Priority Data

May 31, 2023 (KR) ........................ 10-2023-0070476

(51) Int. Cl.

| | |
|---|---|
| ***H04L 12/66*** | (2006.01) |
| ***G06F 3/14*** | (2006.01) |
| ***H04W 28/22*** | (2009.01) |

(52) U.S. Cl.

CPC .............. *H04W 28/22* (2013.01); *G06F 3/14* (2013.01); *H04L 12/66* (2013.01)

(58) Field of Classification Search

CPC ........ H04W 28/22; G06F 3/14; H04L 1/0002; H04L 1/0014; H04L 12/66; H04L 65/613;

(Continued)

(56) References Cited

U.S. PATENT DOCUMENTS 7,865,191 B2 * 1/2011 Nishimura .......... H04W 72/541 455/452.2
8,072,549 B2 12/2011 Inoue et al.

(Continued)

FOREIGN PATENT DOCUMENTS

CN 113128692 B * 4/2024 ............. G06N 20/00
JP 2006-323455 A 11/2006

(Continued)

OTHER PUBLICATIONS

International Search Report issued on Aug. 29, 2024 for International Application No. PCT/KR2024/095812.

(Continued)

*Primary Examiner* — Khanh Q Dinh
(74) *Attorney, Agent, or Firm* — STAAS & HALSEY LLP

(57) ABSTRACT

A gateway apparatus including a communication circuitry configured to perform a wired connection with a source device and wirelessly connect with a sink device that outputs media; an interface configured to receive a user input from a user or output information to the user; and a controller configured to control the communication circuitry and the interface. The controller is configured to: obtain communication performance information of the sink device and obtain Extended Display Identification Data (EDID) including available output formats of the sink device from the sink device via the communication circuitry, obtain information about an environment in which wireless communication with the sink device is performed from the user via the interface, determine a current maximum transmission rate based on the obtained communication performance information of the sink device and the obtained information about the environment in which wireless communication with the sink device is performed, determine a bitrate required to wirelessly transmit data associated with the media in the (Continued)

available output formats included in the EDID to the sink device for output of the media by the sink device, and determine a non-transmittable format among the available output formats, based on the determined bitrate required and the current maximum transmission rate.

15 Claims, 16 Drawing Sheets

(58) Field of Classification Search
CPC ..... H04L 65/756; H04L 65/80; H04N 21/426; H04N 21/4363; H04N 21/442; H04N 21/6373; G09G 2350/00; G09G 2370/12; G09G 2370/20; G09G 5/006; G09G 2370/042; G09G 2370/16
USPC .......................................... 709/220, 224–228
See application file for complete search history.

(56) References Cited

U.S. PATENT DOCUMENTS

| | | | | |
|---|---|---|---|---|
| 8,255,580 | B2 | 8/2012 | Kang et al. | |
| 8,495,685 | B2 | 7/2013 | Moon et al. | |
| 10,462,517 | B2 | 10/2019 | Iwami et al. | |
| 10,582,376 | B2 | 3/2020 | Iwami et al. | |
| 10,841,165 | B2 | 11/2020 | Iwami et al. | |
| 11,068,148 | B2 | 7/2021 | Iwami et al. | |
| 11,158,284 | B2 | 10/2021 | Oh | |
| 11,356,741 | B2 | 6/2022 | Kim | |
| 2007/0206081 | A1* | 9/2007 | Masada | A61K 47/26 347/100 |
| 2008/0191816 | A1* | 8/2008 | Balachandran | H04N 21/2402 333/24 R |
| 2010/0066906 | A1 | 3/2010 | Nakajima | |
| 2011/0032428 | A1* | 2/2011 | Bing | H04N 21/8456 348/608 |
| 2011/0072473 | A1 | 3/2011 | Funabiki et al. | |
| 2011/0228685 | A1* | 9/2011 | Higashi | H04W 28/02 370/252 |
| 2016/0269937 | A1* | 9/2016 | Tomita | H04W 76/10 |
| 2017/0237673 | A1* | 8/2017 | Law | H04L 47/25 370/338 |
| 2018/0069759 | A1* | 3/2018 | Bailey | H04L 12/4013 |
| 2018/0097731 | A1* | 4/2018 | Mutoh | H04L 43/0894 |
| 2021/0184785 | A1* | 6/2021 | Small | H04L 1/0002 |
| 2022/0254320 | A1 | 8/2022 | Choi et al. | |

FOREIGN PATENT DOCUMENTS

| | | | | | |
|---|---|---|---|---|---|
| JP | 2009-284047 | A | | 12/2009 | |
| JP | 2016-146560 | A | | 8/2016 | |
| JP | 2017-28587 | A | | 2/2017 | |
| JP | 2017-135482 | A | | 8/2017 | |
| JP | 6669076 | B2 | | 3/2020 | |
| JP | 7037358 | B2 | | 3/2022 | |
| KR | 10-2007-0073990 | | | 7/2007 | |
| KR | 10-0841434 | | | 6/2008 | |
| KR | 10-2009-0081617 | | | 7/2009 | |
| KR | 10-2010-0115058 | | | 10/2010 | |
| KR | 10-2019-0109964 | | | 9/2019 | |
| KR | 10-2020-0132541 | | | 11/2020 | |
| KR | 20210056210 | A | * | 5/2021 | H04W 28/22 |
| KR | 10-2022-0113180 | | | 8/2022 | |
| KR | 20240171912 | A | * | 12/2024 | H04L 12/66 |
| WO | WO 2022/255506 | A1 | | 12/2022 | |

OTHER PUBLICATIONS

Written Opinion issued on Aug. 29, 2024 for International Application No. PCT/KR2024/095812.

A Link Layer Design for DisplayPort Interface with State Machine Based Packet Processing; Hyun-Bae Jin et al.; Jan. 12, 2014, pp. 89-98; vol. 79, No. 1.

Vesa Enhanced Extended Displa V Identification Data Standard; Defines EDID Structure Version I, Revision 4; Release A, Revision 2; Sep. 25, 2006.

Extended European Search Report issued Apr. 22, 2026 for Application No. 24815960.0.

* cited by examiner

FIG. 3

| | | |
|---|---|---|
| InfoFrame Type Code | InfoFrame Type = 0x03 | |
| InfoFrame Version Number | Version = 0x01 | |
| Length of Source Product Description InfoFrame | Length of Source Product Description InfoFrame = 25 | |
| Data Byte 1 | 0 | Vendor Name Character 1 VN1 (7bit ASCII code) |
| Data Byte 2 | 0 | Vendor Name Character 2 VN2 |
| Data Byte 3 | 0 | Vendor Name Character 3 VN3 |
| Data Byte 4 | 0 | Vendor Name Character 4 VN4 |
| Data Byte 5 | 0 | Vendor Name Character 5 VN5 |
| Data Byte 6 | 0 | Vendor Name Character 6 VN6 |
| Data Byte 7 | 0 | Vendor Name Character 7 VN7 |
| Data Byte 8 | 0 | Vendor Name Character 8 VN8 |
| Data Byte 9 | 0 | Product Description Character 1 PD1 (7bit ASCII code) |
| Data Byte 10 | 0 | Product Description Character 2 PD2 |
| Data Byte 11 | 0 | Product Description Character 3 PD3 |
| Data Byte 12 | 0 | Product Description Character 4 PD4 |
| Data Byte 13 | 0 | Product Description Character 5 PD5 |
| Data Byte 14 | 0 | Product Description Character 6 PD6 |
| Data Byte 15 | 0 | Product Description Character 7 PD7 |
| Data Byte 16 | 0 | Product Description Character 8 PD8 |
| Data Byte 17 | 0 | Product Description Character 9 PD9 |
| Data Byte 18 | 0 | Product Description Character 10 PD10 |
| Data Byte 19 | 0 | Product Description Character 11 PD11 |
| Data Byte 20 | 0 | Product Description Character 12 PD12 |
| Data Byte 21 | 0 | Product Description Character 13 PD13 |
| Data Byte 22 | 0 | Product Description Character 14 PD14 |
| Data Byte 23 | 0 | Product Description Character 15 PD15 |
| Data Byte 24 | 0 | Product Description Character 16 PD16 |
| Data Byte 25 | Source Information | |

FIG. 4

| Byte Address | DESCRIPTION |
|---|---|
| 0~19 | Header information<br>Manufacturer ID, product code, serial number, manufacture date, EDID version, ... |
| 20~24 | Video input parameters<br>Bitdepth, interface, analog, white/sync lenels, sync, screen size, gamma, DPMS display type, sRGB, ...<br>(※ DPMS:Display Power Management Signaling) |
| 25~34 | Chromaticity coordinates<br>CIE 1931 xy coordinates for R/G/B/white point |
| 35~37 | Timing info<br>Support info for established, very common timing modes |
| 38~53 | Standard timing info<br>8 2-byte fields describing standard display modes |
| 54~125 | Detailed Timing Descriptor<br>4 18-byte DTDs(※ DTD:Detailed Timing Descriptors) |
| 126 | Number of extensions<br>Up-to 128 extensions |
| 127 | Checksum<br>Sum of all 128-byte should equal 0 (mod 256) |

FIG. 9

| PROTOCOL | MODE (Antenna / Channel) | MAXIMUM RATE (Mbps) |
|---|---|---|
| 802. 11ac wave1 | 1x1 / 40MHz | 200 |
| | 2x2 / 40MHz | 400 |
| | 1x1 / 80MHz | 433 |
| | 2x2 / 80MHz | 866 |
| 802. 11ac wave2 | 1x1 / 40MHz | 200 |
| | 2x2 / 40MHz | 400 |
| | 1x1 / 160MHz | 866 |
| | 2x2 / 160MHz | 1,733 |
| 802. 11ax | 1x1 / 20MHz | 143 |
| | 2x2 / 20MHz | 287 |
| | 1x1 / 40MHz | 287 |
| | 2x2 / 40MHz | 574 |
| | 1x1 / 80MHz | 601 |
| | 2x2 / 80MHz | 1,200 |
| | 1x1 / 160MHz | 1,200 |
| | 2x2 / 160MHz | 2,400 |

FIG. 10
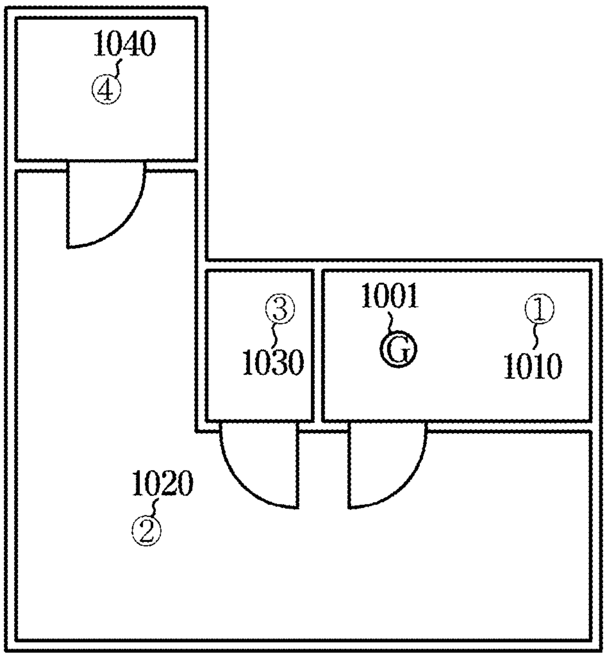
(a)
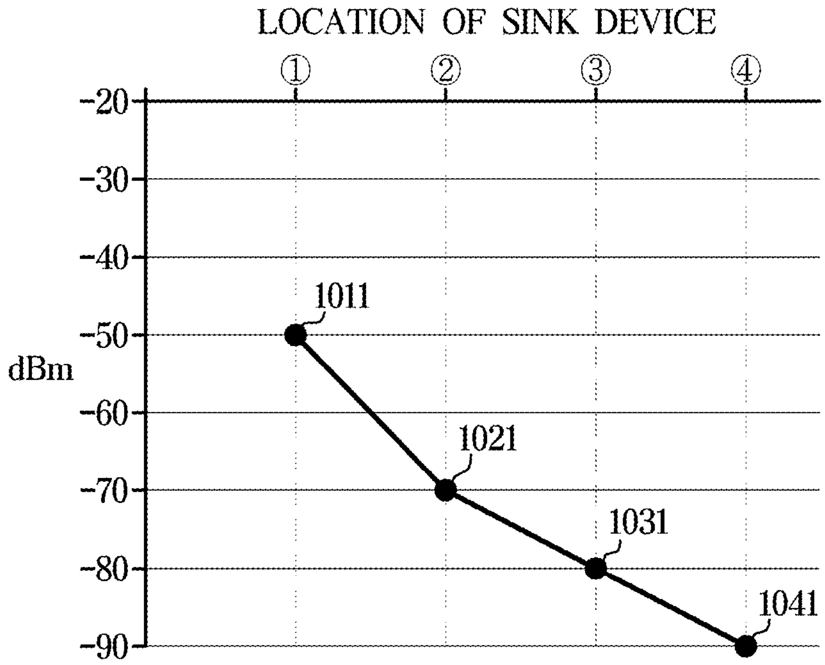
(b)

FIG. 11

| ANGLE \ DISTANCE | 1m | 2m | 5m | 10m |
|---|---|---|---|---|
| 0° ↓ ↑ | 919Mbps | 773Mbps | 1.28Gbps | 814Mbps |
| 45° ↓ ↖ | 995Mbps | 800Mbps | 888Mbps | 488Mbps |
| 90° ↓ ← | 1.03Gbps | 1.26Gbps | 749Mbps | 13.6Mbps |
| 180° ↓ ↓ | 1.02Gbps | 864Mbps | 1.6Gbps | 888Mbps |

FIG. 12

| VIC | Format | Field Rate | Picture Aspect Ratio | Pixel Aspect Ratio | Bitrate (Mbps) |
|---|---|---|---|---|---|
| 1 | 640x480p | 59.94/90Hz | 4:3 | 1:1 | HEVC 2.2<br>H.264 4.4 |
| 2 | 720x480p | 59.94/90Hz | 4:3 | 8:9 | HEVC 2.2<br>H.264 5.0 |
| 4 | 1280x720p | 59.94/90Hz | 16:9 | 1:1 | HEVC 6.7<br>H.264 13.4 |
| 16 | 1920x1080p | 59.94/90Hz | 16:9 | 1:1 | HEVC 15<br>H.264 30 |
| 89 | 2560x1080p | 59.94/90Hz | 64:27 | 1:1 | HEVC 20 |
| 97 | 3840x2160p | 59.94/90Hz | 16:9 | 1:1 | HEVC 60 |
| 199 | 7680x4320p | 59.94/90Hz | 16:9 | 1:1 | HEVC 240 |
| 215 | 10240x4320p | 59.94/90Hz | 64:27 | 1:1 | HEVC 320 |

GATEWAY APPARATUS, METHOD FOR CONTROLLING GATEWAY APPARATUS, AND HANDSHAKING SYSTEM

CROSS-REFERENCE TO RELATED APPLICATION

This application is a continuation application, under 35 U.S.C. § 111(a), of international application No. PCT/KR2024/095812, filed on May 17, 2024, which claims priority under 35 U. S. C. § 119 to Korean Patent Application No. 10-2023-0070476, filed May 31, 2023, the disclosures of which are incorporated herein by reference in their entireties.

BACKGROUND

Field

The disclosure relates to a gateway apparatus, a method for controlling the gateway apparatus, and a handshaking system.

Description of the Related Art

Recently, with the development of image and sound processing technology, a large amount of high-definition and high-sound quality content is being produced. In addition, with the development of communication technology, high-definition and high-sound quality content is required to be wirelessly transmitted. However, in the case of Wi-Fi Miracast, a representative wireless transmission method, only data with limited predetermined specifications may be transmitted regardless of output specifications of a sink device. As a result, even though the content provided by a source device is of high definition and high sound quality, or the sink device supports high specifications, the quality of video or sound that may be viewed or listened to is inevitably low.

SUMMARY

The disclosure provides a gateway apparatus for providing media data of optimal specifications to a wirelessly connected sink device using the gateway apparatus, a method for controlling the gateway apparatus, and a handshaking system.

According to an embodiment of the disclosure, a gateway apparatus may include: a communication circuitry configured to perform a wired connection with a source device and wirelessly connect with a sink device that outputs media; an interface configured to receive a user input from a user or output information to the user; and a controller configured to control the communication circuitry and the interface to: obtain communication performance information of the sink device, and Extended Display Identification Data (EDID) including available output formats of the sink device from the sink device via the communication circuitry, obtain information about an environment in which wireless communication with the sink device is performed from the user via the interface, determine a current maximum transmission rate of the wireless communication with the sink device based on the obtained communication performance information of the sink device and the obtained information about the environment in which wireless communication with the sink device is performed, determine a bitrate required to wirelessly transmit data associated with the media in the available output formats included in the EDID to the sink device for output of the media by the sink device, and determine a non-transmittable format among the available output formats, based on the determined bitrate required and the current maximum transmission rate.

According to an embodiment of the disclosure, a method for controlling a gateway apparatus may include: performing a wired connection with a source device via a communication circuitry, and wirelessly connecting with a sink device that outputs media; obtaining communication performance information of the sink device, and obtain Extended Display Identification Data (EDID) including available output formats of the sink device from the sink device via the communication circuitry; obtaining information about an environment in which wireless communication with the sink device is performed from a user via an interface; determining a current maximum transmission rate of the wireless communication with the sink device based on the obtained communication performance information of the sink device and the obtained information about the environment in which wireless communication with the sink device is performed; determining a bitrate to wirelessly transmit data associated with the media in the available output formats included in the EDID to the sink device for output of the media by the sink device; and determining a non-transmittable format among the available output formats, based on the determined bitrate required and the current maximum transmission rate.

According to an embodiment of the disclosure, a handshaking system may include: a source device; a sink device configured to output media; and a gateway apparatus configured to be connected with the source device by wire and be connected with the sink device wirelessly, wherein the gateway apparatus may be configured to: obtain communication performance information of the sink device, and obtain Extended Display Identification Data (EDID) including available output formats of the sink device from the sink device, obtain information about an environment in which wireless communication with the sink device is performed from a user via an interface, determine a current maximum transmission rate of the wireless communication with the sink device based on the obtained communication performance information of the sink device and the obtained information about the environment in which wireless communication with the sink device is performed, determine a bitrate required to wirelessly transmit data associated with the media in the available output formats included in the EDID to the sink device, and determine a non-transmittable format among the available output formats for output of the media by the sink device, based on the determined bitrate being greater than the current maximum transmission rate.

According to the disclosure, converted media data may be provided to allow a sink device to output optimal audio or video even in a wireless network environment, thereby providing users with a high-quality media viewing or listening experience.

Technical aspects and effects that may be achieved by the disclosure are not limited to the above-mentioned effects, and other technical aspects and effects not mentioned will be clearly understood by one of ordinary skill in the technical art to which the disclosure belongs from the following description.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 illustrates an example of metadata including information related to a source device according to an embodiment.

FIG. 4 illustrates an example of a basic data format of EDID 1.4 storing specification information of a sink device according to an embodiment.

FIG. 9 illustrates an example of a conversion table showing a theoretical maximum transmission rate corresponding to communication performance information according to an embodiment.

FIG. 10 illustrates an example of a maximum transmission rate corresponding to an operating environment of wireless transmission according to an embodiment.

FIG. 11 illustrates an example of a table showing actual measured values of current maximum transmission rate that vary depending on a distance to a sink device and an angle of an antenna in an environment in which wireless communication with the sink device is performed according to an embodiment.

FIG. 12 illustrates an example of a conversion table defining a bitrate required to transmit a media format according to an embodiment.

BRIEF DESCRIPTION OF THE DRAWINGS

Figure 1:
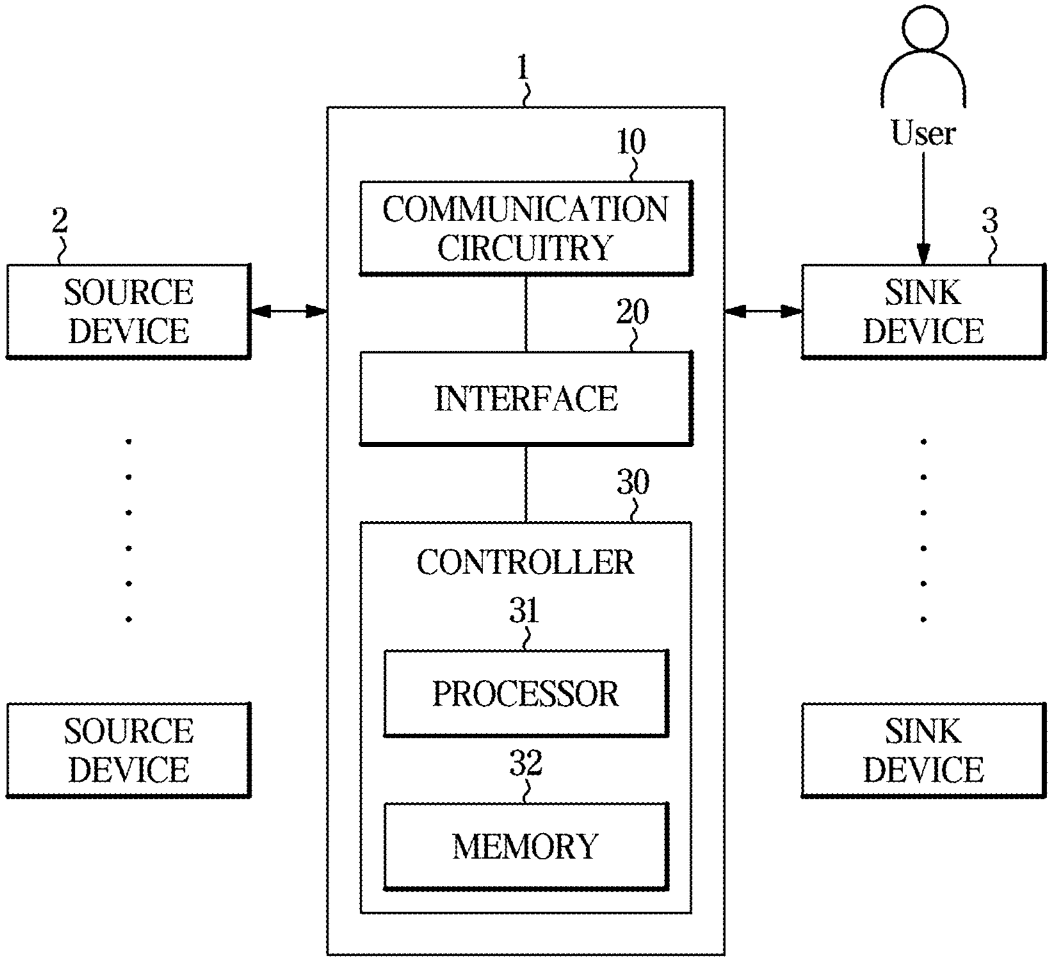
FIG. 1 illustrates a structure of a handshaking system according to an embodiment.

Embodiments described in the specification and configurations shown in the accompanying drawings are merely examples of the disclosure, and various modifications may replace the embodiments and the drawings of the disclosure at the time of filing of the application.

Like reference numerals or symbols denoted in the drawings of the specification are members or components that perform the substantially same functions.

A singular form of a noun corresponding to an item may include one item or a plurality of the items unless context clearly indicates otherwise.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

It will be understood that the terms "first", "second", or the like, may be used only to distinguish one component from another, not intended to limit the corresponding component in other aspects (e.g., importance or order).

When it is said that one (e.g., first) component is "coupled" or "connected" to another (e.g., second) component, with or without the terms "functionally" or "communicatively", it means that one component may be connected to the other component directly (e.g., by wire), wirelessly, or through a third component.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

An expression that one component is "connected", "coupled", "supported", or "in contact" with another component includes a case in which the components are directly "connected", "coupled", "supported", or "in contact" with each other and a case in which the components are indirectly "connected", "coupled", "supported", or "in contact" with each other through a third component.

It will also be understood that when one component is referred to as being "on" or "over" another component, it may be directly on the other component or intervening components may also be present.

The term "and/or" includes any and all combinations of one or more of a plurality of associated listed items.

Hereinafter, an operation principle and embodiments of the disclosure is described in detail with reference to the accompanying drawings.

FIG. 1 illustrates a structure of a handshaking system according to an embodiment.

Referring to FIG. 1, a handshaking system may include a gateway apparatus 1, at least one source device 2 connected to the gateway apparatus 1, and at least one sink device 3 connected to the gateway apparatus 1.

Here, the source device 2 may include devices that provide media data including video data and audio data, such as a game console, Personal Computer (PC), Set-Top Box (STB), and Blu-ray Disc (BD) Player.

The source device 2 may include ports for coupling with a connector to perform connection with the gateway apparatus 1. Here, the connector may include High Definition Multimedia Interface (HDMI), DisplayPort, and the like.

In addition, the source device 2 may include at least one processor controlling an operation of the source device 2, and at least one memory storing a program for controlling an operation of the source device 2.

The sink device 3 may include a media device that outputs an image (video) or sound based on media data provided from the source device 2. The sink device 3 may include a television (TV), a monitor, and the like, equipped with a display for outputting video and a speaker for outputting sound.

The sink device 3 may include a communication circuitry capable of communicating with the source device 2 or the gateway apparatus 1, a user interface for receiving a user input or outputting information to the user, at least one processor controlling an operation of the sink device 3, and at least one memory storing a program for controlling an operation of the sink device 3.

The gateway apparatus 1 may include a communication circuitry capable of communicating with another gateway apparatus 1, the source device 2, or the sink device 3, at least one processor 31 processing data received from the other gateway apparatus 1, the source device 2, or the sink device 3, and at least one memory 32 storing a program for processing the data or the processed data.

The gateway apparatus 1 may be implemented as various computing devices such as a workstation, cloud, data drive, and data station. The gateway apparatus 1 may be implemented as one or more gateway apparatuses 1 that are physically or logically separated based on functions, detailed configuration of functions, or data, may transmit and receive data through communication between each of the gateway apparatuses 1, and may process the transmitted and received data.

The gateway apparatus 1 may perform functions, such as managing a user account, registering the source device 2 and the sink device 3 in association with the user account, and managing or controlling the registered source device 2 and sink device 3.

For example, a user may access the gateway apparatus 1 through the user interface of the sink device 3 and may generate a user account. The user account may be identified by an identifier (ID) and a password set by the user. The gateway apparatus 1 may register the source device 2 and the sink device 3 to the user account according to a predetermined procedure. For example, the gateway apparatus 1 may link identification information (such as a serial number or MAC address) of the source device 2 or the sink device 3 to the user account to register, manage, and control the source device 2 or the sink device 3.

In addition, a user may perform functions such as managing or controlling the source device 2 or the sink device 3 through an interface 20 included in the gateway apparatus 1, as described below.

In addition, the gateway apparatus 1 may communicate with at least one server. The server described herein may include a server for performing wireless communication with the sink device 3, another server for performing communication with a user device, and the like.

The aforementioned functions such as managing or controlling the source device 2 or the sink device 3, and control of the gateway apparatus 1 for handshaking according to the disclosure, which will be described later, may also be performed by a user device.

That is, a user may access a server through a user device and may generate a user account. The user account may be identified by an ID and a password set by the user.

The server may register the gateway apparatus 1, the source device 2, or the sink device 3 to the user account according to a predetermined procedure. For example, the server link identification information of (such as a serial number or MAC address) of the gateway apparatus 1, the source device 2, or the sink device 3 to the user account to register, manage, and control the gateway apparatus 1, the source device 2 or the sink device 3.

The user device may include a communication circuitry capable of communicating with the gateway apparatus 1, the source device 2, the sink device 3, or the server, a user interface for receiving a user input or outputting information to the user, at least one processor controlling an operation of the user device, and at least one memory storing a program for controlling an operation of the user device.

The user device may be carried by a user, or placed in a user's home or office, or the like. The user device may include a personal computer, a terminal, a portable telephone, a smartphone, a handheld device, a wearable device, a display, and the like, without being limited thereto.

The memory of the user device may store a program for controlling the gateway apparatus 1, the source device 2, or the sink device 3, i.e., an application. The application may be sold installed on the user device, or may be downloaded from an external server for installation.

By executing the application installed on the user device by a user, the user may access the server, generate a user account, and perform communication with the server based on the login user account to register the gateway apparatus 1, the source device 2, or the sink device 3.

For example, by operating the gateway apparatus 1, the source device 2, or the sink device 3 to enable the gateway apparatus 1, the source device 2, or the sink device 3 to access the server according to a procedure guided by the application installed on the user device, the server may register the gateway apparatus 1, the source device 2, or the sink device 3 with the user account by assigning the identification information (such as a serial number or MAC address) of the gateway apparatus 1, the source device 2, or the sink device 3 to the corresponding user account.

A user may control the gateway apparatus 1, the source device 2, or the sink device 3 using the application installed on the user device. For example, by logging into a user account with the application installed on the user device, the gateway apparatus 1, the source device 2, or the sink device 3 registered in the user account appears, and by inputting a control command for the gateway apparatus 1, the source device 2, or the sink device 3, the control command may be transmitted to the gateway apparatus 1, the source device 2, or the sink device 3 through the server.

The gateway apparatus 1 may be connected by wire to at least one source device 2, and may be connected wirelessly to at least one sink device 3. Wired connection methods may include HDMI, DisplayPort, and the like. In addition, wireless connection methods may include WiBro, Bluetooth™ (IEEE 802.15.1), Zigbee (IEEE 802.15.4), Wi-Fi Access Point (Wi-Fi AP), Wi-Fi Direct, Near Field Communication (NFC), Z-Wave, and the like.

In a case where the source device 2 provides media data using a wired connection method, detailed specifications including performance information of the sink device 3 may be transmitted to the source device 2, and based on the performance information, the source device 2 may provide high quality media data through a rendering process that enables audio or video to be output by the sink device 3 in optimal quality from among a variety of rendering options that may be provided by the source device 2.

On the other hand, in a case where the source device 2 provides media data using a wireless connection method, as opposed to the wired connection method described above, media data may only be transmitted according to predetermined limited specifications regardless of the performance of the sink device 3. Accordingly, even though the sink device 3 supports high performance, the quality of video and audio that may be viewed or listened to is inevitably low.

The wireless transmission method has recently become inevitable, and thus the disclosure may employ the gateway apparatus 1 between the source device 2 and the sink device 3 to transmit media data with optimal specifications that may fully utilize the performance of the source device 2 and the sink device 3.

The gateway apparatus 1 may include a communication circuitry 10, the interface 20, and a controller 30.

The communication circuitry 10 may communicate with at least one sink device 3, at least one source device 2, and other external devices. That is, the source device 2 and the sink device 3 may each receive data from the gateway apparatus 1 or may each transmit data to the gateway apparatus 1 via the communication circuitry 10. In addition, data may be received from a remote control or a user device, as a representative example of other external devices that may remotely control the gateway apparatus 1.

Accordingly, the communication circuitry 10 may include components capable of wired and wireless connection. For example, the communication circuitry 10 may include a communication port for a wired connection to a connector of the source device 2.

In addition, in order to be wirelessly connected to the sink device 3, the communication circuitry 10 may include a wireless communication circuit for connecting to a wireless network through an Access Point (AP) or for Wi-Fi direct connection.

The data transmitted and received via the communication circuitry 10 may include identification information for identifying the source device 2, performance information for identifying the sink device 3, a selection signal of the source device 2 input from a user, network profile information for implementing the wireless connection method, media data for outputting video or audio, and the like.

The interface 20 may receive a user input or output information to a user.

For example, the interface 20 may receive a selection signal corresponding to a user input for selecting a source device 2 to provide media data among the at least one source device 2 connected by wire. In addition, the interface 20 may receive a selection signal corresponding to a user input for selecting a sink device 3 to output media among the at least one sink device 3 connected wirelessly.

In addition, the interface 20 may obtain environment information indicating information about a space where wireless communication with the sink device 3 is performed from the user.

The environment information may include at least one of the number of obstacles located on a wireless communication path to the sink device 3, a distance from the sink device 3, or a direction of an antenna.

The expression "at least one" above may include all cases of only the number of obstacles located on the path to the sink device 3, only the distance from the sink device 3, only the direction of the antenna, both the number of obstacles located on the path to the sink device 3 and the distance from the sink device 3, both the number of obstacles located on the path to the sink device 3 and the direction of the antenna, both the distance from the sink device 3 and the direction of the antenna, and all three of the above.

The interface 20 may be provided with an input interface and an output interface.

The input interface may include a key, a touch screen, a microphone, and the like. The input interface may receive a user input and transmit the user input to the processor 31.

The output interface may include a display, a speaker, and the like. The output interface may output various notifications, messages, information, and the like, generated by the processor 31.

Each piece of information received via the communication circuitry 10 may be transmitted to the controller 30.

The controller 30 may be electrically connected to the communication circuitry 10 and the interface 20, and may control the communication circuitry 10 and the interface 20. The controller 30 may include at least one processor 31 for controlling the communication circuitry 10 and the interface 20, and at least one memory 32 storing data received via the communication circuitry 10 and the interface 20.

The memory 32 and the processor 31 may be implemented as separate chips. The processor 31 may include one or two or more processor chips, or may include one or two or more processing cores. The memory 32 may include one or two or more memory chips or may include one or two or more memory blocks. In addition, the memory 32 and the processor 31 may be implemented as a single chip.

The processor 31 may process a user input of the interface 20 according to programs and/or data stored in the memory 32, and may control an operation of the interface 20. The processor 31 may receive a user input from the interface 20. In addition, the processor 31 may transmit, to the interface 20, an output signal and image data to output an image (video) or sound in response to the user input.

A single gateway apparatus 1 is shown in FIG. 1, but the disclosure is not limited thereto, and a plurality of gateway apparatuses 1 may be provided.

Figure 2:
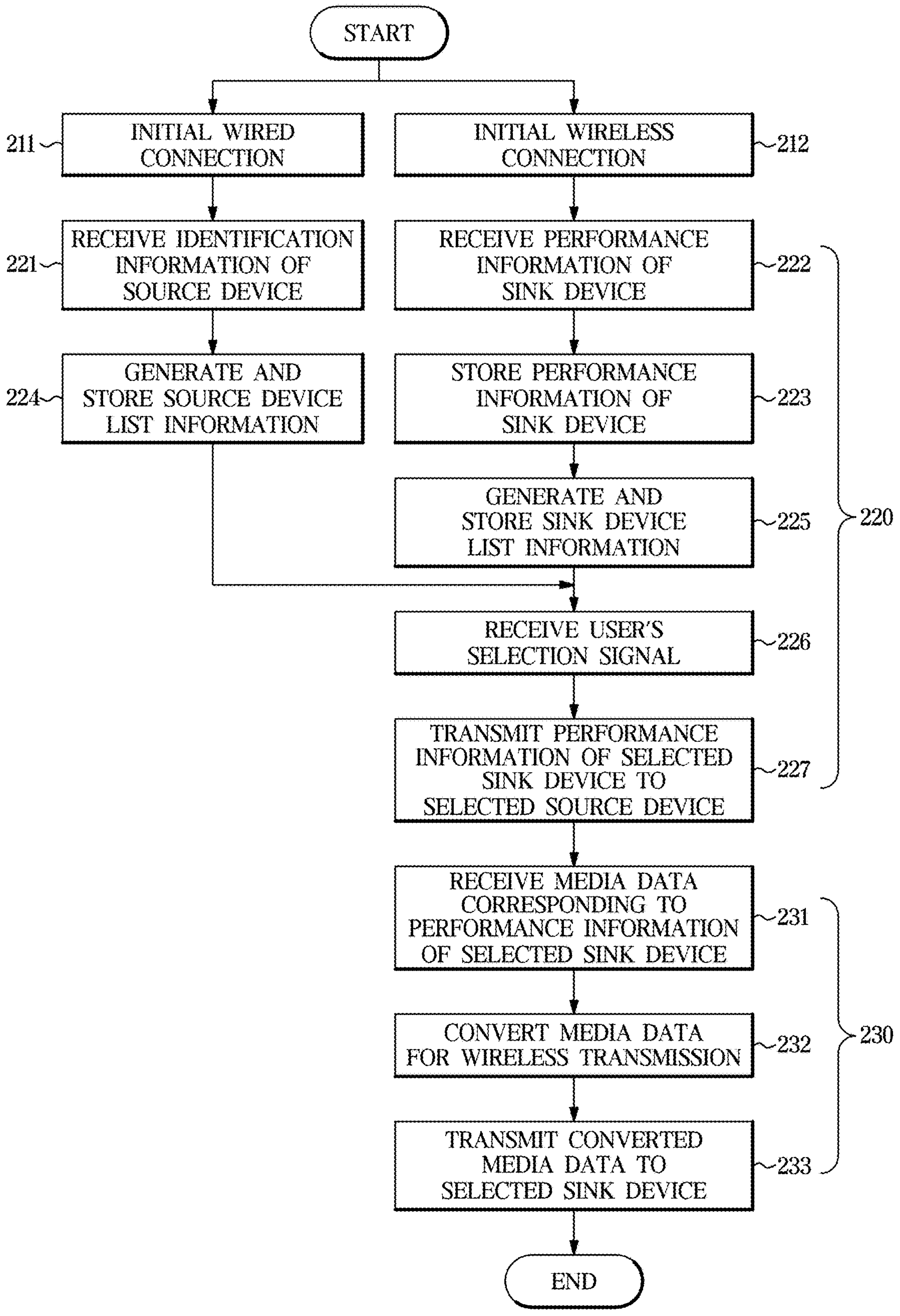
FIG. 2 is a flowchart illustrating a method for controlling a gateway apparatus according to an embodiment.

FIG. 2 is a flowchart illustrating a method for controlling a gateway apparatus according to an embodiment.

Referring to FIG. 2, a method for controlling the gateway apparatus 1 may be broadly divided into three stages: initial connection (210), device selection (220), and data processing and transmission (230).

In the first stage, initial physical connection with each source device 2 and each sink device 3 may be performed (210).

As described above, the initial connection between the gateway apparatus 1 and the source device 2 may be performed via the communication circuitry 10 as a user connects the gateway apparatus 1 and the source device 2 by wire (211).

Meanwhile, in a case of a plurality of gateway apparatuses 1, a user may determine which source device 2 is to be connected by wire to each of the gateway apparatuses 1 among the plurality of gateway apparatuses 1.

For example, in a case where a first gateway apparatus 1 and a second gateway apparatus 1 perform handshaking, a source device A and a source device B provide audio data, and a source device C and a source device D provide video data, a user may connect the source devices A and B providing audio data to the first gateway apparatus 1 by wire, and may connect the source devices C and D providing video data to the second gateway apparatus 1 by wire.

As such, in a case where the plurality of gateway apparatuses 1 are provided, different source devices 2 may be connected depending on the type of media data provided to each of the gateway apparatuses 1 or depending on the media data that the user desires to provide to each of the gateway apparatuses 1.

As described above, the initial connection between the gateway apparatus 1 and the sink device 3 may be performed via the communication circuitry 10 as the user connects the two devices wirelessly (212). For example, the user may select to connect the gateway apparatus 1 to the sink device 3 among connectable devices connected to a wireless network.

In order to allow the user to select the gateway apparatus 1 in the sink device 3, a manual for wireless connection may be output to the interface 20. The output format may be video or audio, and is not limited as long as the user recognizes connectable devices connected to the wireless network.

A selection method may include, but is not limited to, an input dial, an input button, a remote control input, a touch screen panel, voice recognition, and the like.

Here, in a case where wireless connection is performed through the remote control input, a remote control may be connected to the gateway apparatus 1 in advance. Accordingly, the remote control and the gateway apparatus 1 may be automatically connected via the communication circuitry 10, and the controller 30 may perform a wireless connection with the sink device 2 by directly controlling the gateway apparatus 1 through remote control operation.

In addition, in a case where automatic connection is not performed because the remote control and the gateway apparatus 1 are not connected in advance, the controller 30 may perform additional settings to enable a wireless connection between the remote control and the gateway apparatus 1 via the communication circuitry 10.

In order to wirelessly connect the gateway apparatus 1 and the remote control, a manual for selecting a remote control to be connected may be output to the interface 20 of the gateway apparatus 1. The output format may be video or audio, and is not limited as long as the user recognizes a connectable remote control.

A selection method may include, but is not limited to, an input dial, an input button, a touch screen panel, voice recognition, and the like.

For example, information that the Bluetooth of the remote control has been detected and a manual for asking a user whether to connect may be provided through the interface 20 of the gateway apparatus 1, and the user may input a remote control connection signal via the touch screen panel provided in the interface 20 or a voice recognition module. Accordingly, wireless connection between the remote control and the gateway apparatus 1 may be performed.

In addition, in order to allow the user to select the gateway apparatus 1 in the sink device 3, a selection manual may be output to the user interface of the sink device 3. The output format may be video or audio, and is not limited as long as the user recognizes the sink device as a connectable device connected to the wireless network.

A selection method may include, but is not limited to, an input dial, an input button, a remote control input, a touch screen panel, voice recognition, and the like.

Here, in a case where the user makes a selection through the remote control input, a remote control may be connected to the sink device 3 in advance. That is, the remote control may transmit an input signal of the user to the sink device 3 through the user interface of the sink device 3.

Meanwhile, in order to perform a wireless connection between the sink device 3 and the gateway apparatus 1, the controller 30 of the gateway apparatus 1 according to an embodiment may receive network profile information from the sink device 3 via the communication circuitry 10, and the memory 32 may store the received network profile information.

The network profile information is information for the controller 30 of the gateway apparatus 1 to identify the sink device 3 on the wireless network, and may include Internet Protocol (IP) address, Media Access Control (MAC) address, Service Set Identifier (SSID), and Port information, and the like.

In addition, in order to set an automatic wireless connection between the gateway apparatus 1 and the sink device 3, the controller 30 may receive a constant connection signal from the sink device 3 via the communication circuitry 10. In addition, the memory 32 may store automatic connection authorization information corresponding to the received constant connection signal.

As such, by storing and managing the network profile information, in a case where a user attempts to connect the sink device 3 and the gateway apparatus 1 again after the initial connection between the sink device 3 and the gateway apparatus 1, the sink device 3 and the gateway apparatus 1 may be set to be automatically connected when the sink device 3 and the gateway apparatus 1 are turned on, without the user having to perform separate controls for wireless connection, because the server stores all the information required for the wireless connection between the gateway apparatus 1 and the sink device 3.

Meanwhile, in a case of a plurality of gateway apparatuses 1, a user may select which sink device 3 is to be wirelessly connected to each of the gateway apparatuses 1 from among the plurality of gateway apparatuses 1.

That is, among the plurality of gateway apparatuses 1 connected to the wireless network, a gateway apparatus 1 to be connected to each of the sink devices 3 may be selected via the sink device 3 and may be connected to each sink device 3, thereby enabling an initial wireless connection between the sink device 3 and each of the gateway apparatuses 1. Here, a plurality of gateway apparatuses 1 may be connected to each of the sink devices 3.

For example, in a case where a first gateway apparatus 1 and a second gateway apparatus 1 may perform handshaking, and a sink device X and a sink device Y exist, a user may wirelessly connect to the first gateway apparatus 1 via the sink device X, and wirelessly connect to the second gateway apparatus 1 via the sink device Y. The user may also wirelessly connect to the first gateway apparatus 1 and the second gateway apparatus 1 via the sink device X.

In a case where the plurality of gateway apparatuses 1 are provided as described above, different sink devices 3 may be connected depending on the type or specification of media output from each of the gateway apparatuses 1, or depending on the user's desire.

Referring to FIG. 2, the second stage is to select a source device 2 to provide media data and a sink device 3 to receive the media data by a user (220).

That is, the user may select at least one sink device 3 to receive media data from among the wirelessly connected sink devices 3, and select at least one source device 2 to provide the media data from among the source devices 2 connected by wire.

In order to allow the user to select a portion of the connected source devices 2 and sink devices 3, the gateway apparatus 1 is required to receive information for identifying the source devices 2 and the sink devices 3 via the communication circuitry 10.

In order to perform the above operation, the controller 30 of the gateway apparatus 1 according to an embodiment may receive identification information of the source device 2 connected by wire, via the communication circuitry 10 (221).

Specifically, the controller 30 may determine whether the source device 2 is operable based on a power-on signal supplied from a power pin of a connector connected to the source device 2. In addition, based on a determination that the source device 2 is operable, the controller 30 may receive the identification information from the source device 2 via the communication circuitry 10.

Here, the identification information of the source device 2 may include at least one metadata (Source Product Description InfoFrame (SPDIF)) related to a product and a manufacturer.

FIG. 3 illustrates an example of metadata including information related to a source device.

Referring to FIG. 3, a left column of FIG. 3 represents item names included in metadata, and a right column represents a description of each of the item names. That is, in FIG. 3, a metadata format is 0x03, a metadata version is 0x01, and a metadata length is 25 bytes. In addition, bytes 1 to 8 may represent manufacturer-related information according to a 7-bit ASCII code, and bytes 9 to 24 may represent product-related information according to a 7-bit ASCII code.

The manufacturer-related information may include a manufacturer name of the source device. The product-related information may include a product name, a model name, a serial number, and specification information of the source device.

In addition, according to an embodiment, the controller 30 of the gateway apparatus 1 may receive performance information of the wirelessly connected sink device 3 via the communication circuitry 10 (222).

In addition, the controller 30 may store the performance information of the wirelessly connected sink device 3 in the memory 32 (223).

Here, the performance information may include Extended Display Identification data (EDID) and communication performance information.

EDID refers to a data standard for transmitting AV specifications supported by display devices such as TVs, monitors, and projectors to video sources.

That is, the EDID may include information related to a media format (hereinafter, also referred to as "available output format") that may be output by the sink device 3.

The latest version of EDID is EDID 1.4, and Enhanced EDID (E-EDID) is generally referred to since EDID 1.2. However, "EDID" in the disclosure includes E-EDID.

FIG. 4 illustrates an example of a basic data format of EDID 1.4 storing specification information of a sink device.

Referring to FIG. 4, EDID of the sink device 3 may include detailed information related to a manufacturer, a product, a video input support, a video timing, and the like. A basic data size of EDID is 128 bytes. More information may be stored by specifying 126 additional extension data, and a size of each extension data may be 32 bytes. A maximum size of EDID may be limited to 32 kilobytes.

CTA-861, HDMI, and the like, may customize EDID through dedicated data block formats. Various extension data used in the CTA-861 standard may include more detailed information than the specification information shown in FIG. 4, such as supported audio/video format information, information about vendor's proprietary features, speaker/room information for multi-channel audio, static/dynamic HDR metadata, and the like.

The communication performance information is information for estimating an available band in which the sink device 3 may receive media data from the gateway apparatus 1.

The communication performance information may include Wi-Fi version, frequency band, Multiple User-Multiple Input Multiple Output (MU-MIMO) information, antenna information, or other metadata.

For example, the Wi-Fi version may include information about Wi-Fi standards supported by a device, and may include information related to protocols such as IEEE 802.11a, IEEE 802.11b, IEEE 802.11g, IEEE 802.11n, IEEE 802.11ac, IEEE 802.11ax, IEEE 802.11be, and the like, and version-related information such as Wi-Fi 4, Wi-Fi 5, Wi-Fi 6, Wi-Fi 6E, and Wi-Fi 7.

In addition, the frequency band may include information related to radio frequencies used by the device, and may include frequency information such as 2.4 GHz, 5 GHz, 6 GHz, and the like, or indications of multi-band support.

MU-MIMO, which stands for Multiple User-Multiple Input Multiple Output, refers to a function of simultaneous data transmission and reception with multiple devices. Information related to MU-MIMO includes 2×2, 3×3, 4×4, and the like, which indicates the number of antennas in a base station and a terminal. For example, 4×4 refers to four antennas in a base station and four antennas in a terminal.

Information related to an antenna may include metadata about directivity, whether beamforming is supported, whether band aggregation is supported, and the like.

Meanwhile, in a case where a wireless communication with the sink device 3 goes through a communication relay device such as a Wi-Fi AP or Extender, the gateway apparatus 1 may obtain communication performance information of the communication relay device in addition to the communication performance information of the sink device 3, because during wireless transmission, going through the communication relay devices may deteriorate overall communication performance depending on a performance of the communication relay device.

As will be described later, the controller 30 may determine a maximum transmission band for a wireless transmission path between the sink device 3 and the gateway apparatus 1 based on the communication performance information of each communication relay device used for wireless communication including the communication performance information of the sink device 3.

The selection of the source device 2 and the sink device 3 by the user may be made through the interface 20 of the gateway apparatus 1 or through the user interface of the sink device 3.

Referring again to FIG. 2, the gateway apparatus 1 may generate list information of the source device 2 (hereinafter, also referred to as "source device list information") based on the identification information received from the source device 2, and may store the source device list information in the memory 32 (224).

In addition, in order to allow the user to select the sink device 3 through the interface 20 of the gateway apparatus 1, the controller 30 may generate list information of the wirelessly connected sink device 3 (hereinafter, also referred to as "sink device list information") based on the performance information of the wirelessly connected sink device 3, and the gateway apparatus 1 may store the sink device list information in the memory 32 (225).

Figure 5:
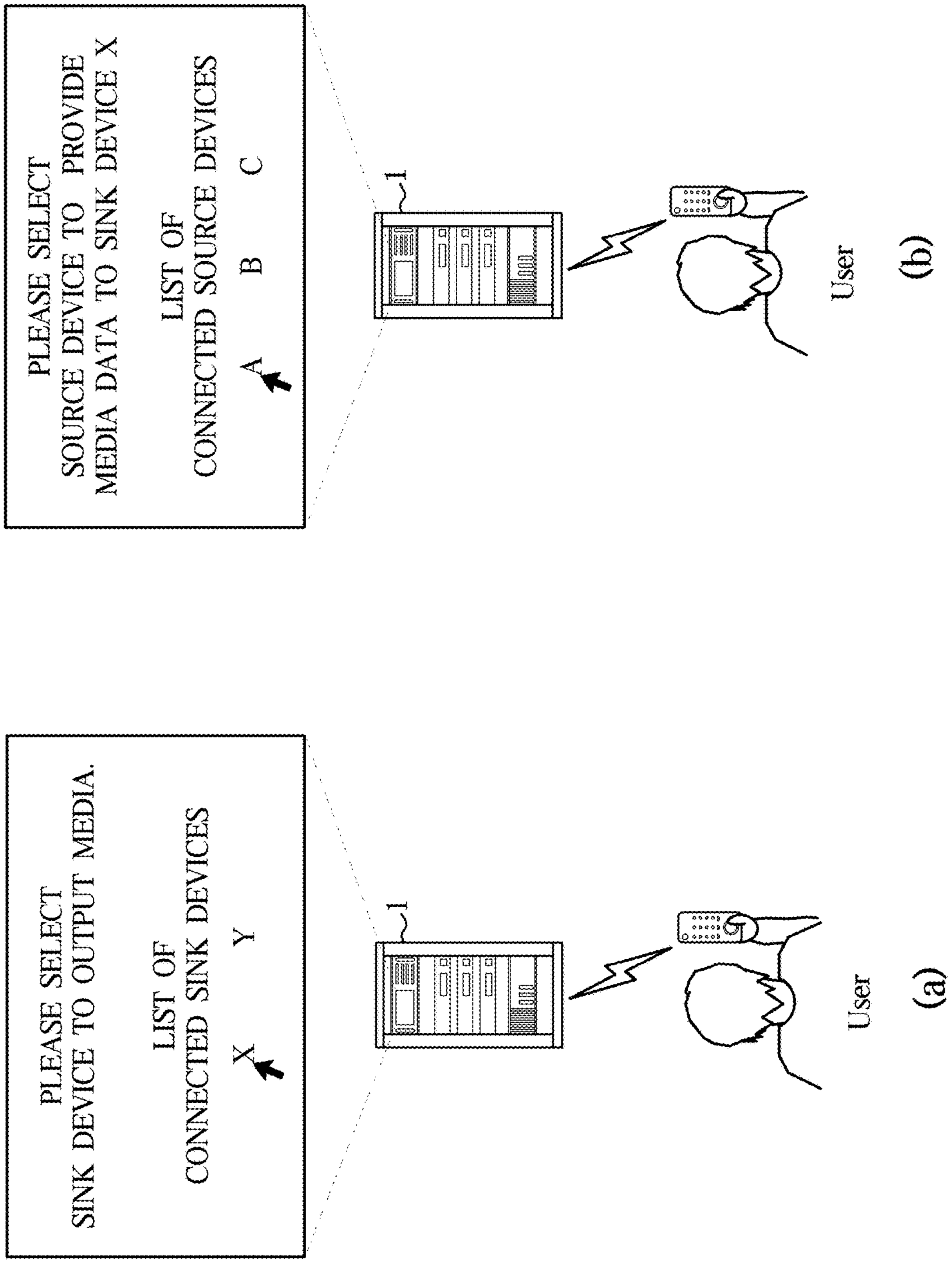
FIG. 5 illustrates an example of selecting a source device and a sink device through an interface of a gateway apparatus according to an embodiment.

FIG. 5 illustrates an example of selecting a source device and a sink device through an interface of a gateway apparatus according to an embodiment.

Referring to FIG. 5*a*, the controller 30 may output the sink device list information stored in the memory 32 to the interface 20.

The output format may be video or audio, and is not limited as long as a user may recognize performance information of the sink device 3.

Referring to FIG. 5*b*, in order to allow the user to select the source device 2 through the interface 20 of the gateway apparatus 1, the controller 30 may output the generated source device list information to the interface 20 of the gateway apparatus 1.

The output format may be video or audio, and is not limited as long as the user may recognize information about the source device 2.

The user may select a sink device 3 to receive media data from the gateway apparatus 1 based on the sink device list information output to the interface 20.

In addition, the user may select a source device 2 to provide media data to each of the previously selected sink devices 3 based on the source device list information output to the interface 20.

A selection method may include, but is not limited to, an input dial, an input button, a remote control input, a touch screen panel, voice recognition, and the like.

Here, in a case where the source device 2 and the sink device 3 are selected through the remote control input, a remote control may be connected to the gateway apparatus 1 in advance. Accordingly, the remote control and the gateway apparatus 1 may be automatically connected via the communication circuitry 10, and the controller 30 may directly control the gateway apparatus 1 through remote control operation.

A communication method between the remote control and the gateway apparatus 1 may include various communication methods such as BlueTooth (BT), Bluetooth Low Energy (BLE), Wireless Fidelity (Wi-Fi), Zigbee, Infrared (IR), Serial Interface, Universal Serial Bus (USB), and Near Field Communication (NFC).

Accordingly, the communication circuitry 10 may receive, but is not limited to, any one of an IR signal, a BT signal, a BLE signal, and a Zigbee signal. The communication circuitry 10 may receive signals of various frequency ranges.

In addition, in a case where automatic connection is not performed because the remote control and the gateway apparatus 1 are not connected in advance, the controller 30 may perform additional settings to allow the remote control and the gateway apparatus 1 to be wirelessly connected via the communication circuitry 10.

In order to wirelessly connect the gateway apparatus 1 and the remote control, a selection manual may be output to the interface 20 of the gateway apparatus 1. The output format may be video or audio, and is not limited as long as the user recognizes a connectable remote control.

A selection method may include, but is not limited to, an input dial, an input button, a touch screen panel, voice recognition, and the like.

For example, information that the Bluetooth of the remote control has been detected and a manual for asking a user whether to connect may be provided through the interface 20 of the gateway apparatus 1, and the user may input a remote control connection signal via the touch screen panel provided in the interface 20 or a voice recognition module. Accordingly, wireless connection between the remote control and the gateway apparatus 1 may be performed.

As a result, the gateway apparatus 1 may receive a user's selection signal for the sink device 3 through the interface 20, and receive a user's selection signal for the source device 2 through the interface 20 (226).

Figure 6:
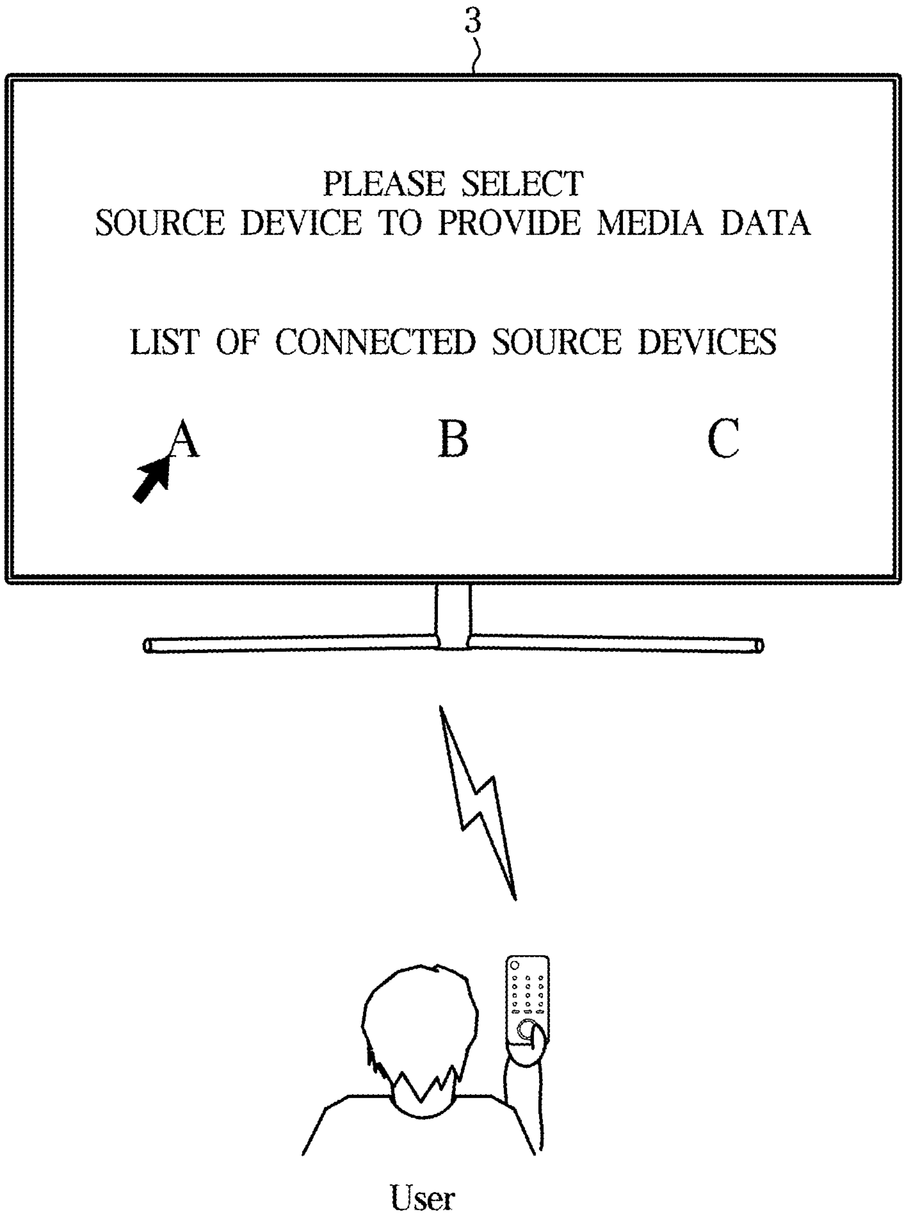
FIG. 6 illustrates an example of selecting a source device and a sink device through a user interface of a sink device according to an embodiment.

FIG. 6 illustrates an example of selecting a source device and a sink device via a user interface of a sink device according to an embodiment.

Referring to FIG. 2, described is a difference between selecting the source device 2 and the sink device 3 through the interface 20 of the gateway apparatus 1 as shown in FIG. 5 and selecting the source device 2 and the sink device 3 through the user interface of the sink device 3 as shown in FIG. 6.

In a case where the source device 2 and the sink device 3 are selected through the interface 20 of the gateway apparatus 1, the gateway apparatus 1 may manage a list of sink devices 3, and thus an operation of generating and storing sink device list information may be required (225).

However, in a case where the source device 2 and the sink device 3 are selected through the user interface of the sink device 3, instead of generating and storing the sink device list information (225), an operation of transmitting the source device list information to the sink device 3 may be required.

Hereinafter, selection through the user interface of the sink device 3, including transmission of the source device list information to the sink device 3, is described in detail.

Referring to FIG. 6, in order to allow the user to select the source device 2 through the user interface of the sink device 3, the controller 30 may transmit the source device list information to the wirelessly connected sink device 3 via the communication circuitry 10.

The sink device 3 may output the source device list information, transmitted from the gateway apparatus 1, to the user interface of the sink device 3.

Based on the source device list information output to the sink device 3, the user may select the source device 2 to provide media data, through the sink device 3.

In order to allow the user to select the source device 2 through the sink device 3, a selection manual may be output to the user interface of the sink device 3. The output format may be video or audio, and is not limited as long as the user recognizes the source device list information.

A selection method may include, but is not limited to, an input dial, input button, remote control input, touch screen panel, voice recognition, and the like.

Here, in a case where the source device 1 is selected through the remote control input, a remote control may be connected to the sink device 3 in advance. That is, the remote control may transmit an input signal of the user to the sink device 3 through the user interface of the sink device 3.

Accordingly, the controller 30 may receive the user's selection signal for at least one source device 2 from the sink device 3 via the communication circuitry 10.

The sink device 3 where the selection signal for the source device 2 is input from the user corresponds to the sink device 3 that the user desires to output media data in audio or video. As a result, the gateway apparatus 1 may obtain the selection signal for the user-desired source device 2 from the user-desired sink device 3, thereby simultaneously obtaining the selection signal for the user-desired sink device 3.

Accordingly, the user's selection of the source device 2 and the sink device 3 may be made.

The controller 30 may transmit performance information of the selected sink device 3 to each of the at least one source device 2 based on the selection signal for the source device 2 (227).

That is, in response to receiving the selection signals for the source device 2 and the sink device 3 from the interface 20 or the user interface of the sink device 3, the gateway apparatus 1 may transmit the performance information of the selected sink device 3 to the selected source device 2.

Here, the performance information of the sink device 3 transmitted to the selected source device 2 may refer to the performance information of the sink device 3 that transmits the selection signal for the source device 2 from among the performance information of the wirelessly connected sink devices 3 stored in the memory 32.

Figure 7:
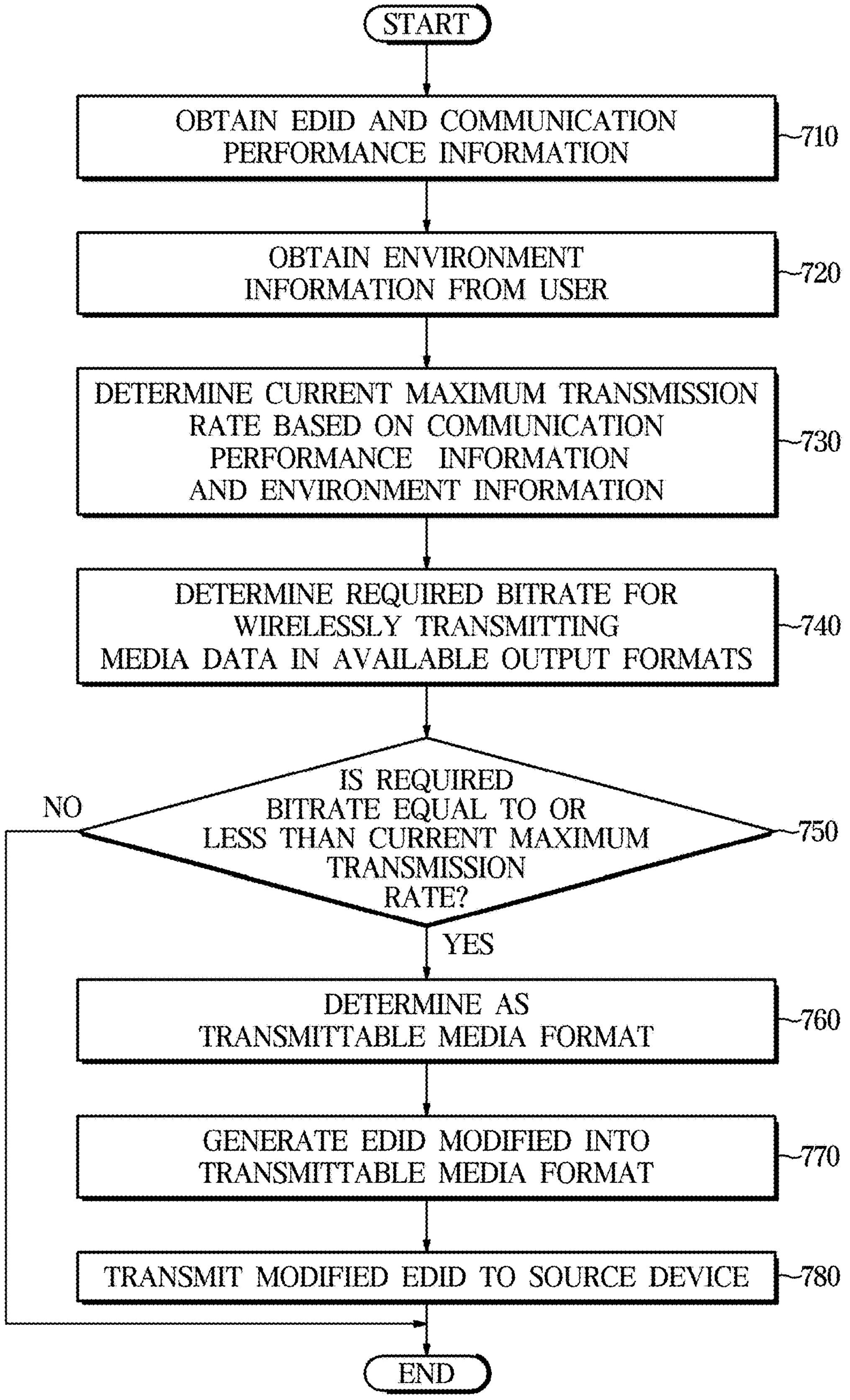
FIG. 7 is a flowchart illustrating a method for modifying Extended Display Identification Data (EDID) of a sink device according to an embodiment.

FIG. 7 is a flowchart illustrating a method for modifying EDID of a sink device according to an embodiment.

Referring to FIG. 7, the gateway apparatus 1 may modify EDID of the selected sink device 3 and may transmit the modified EDID to a selected source device 2.

The operation of modifying the EDID according to FIG. 7 may be performed between the operation of receiving the user's selection signal (226) and the operation of transmitting the performance information of the selected sink device to the selected source device (227) in FIG. 2.

That is, the controller 30 may appropriately modify the EDID of the selected sink device 3 via the communication circuitry 10, which will be described later, and then transmit the modified EDID to the selected source device 2.

The controller 30 may obtain performance information of the sink device 3 from the sink device 3 via the communication circuitry 10. The controller 30 may also obtain the performance information of the selected sink device 3 from among performance information of sink devices 3 stored in the memory 32 (710).

Here, as described above, the performance information may include communication performance information and EDID including an available output format of the sink device 3.

The controller 30 may obtain a user input for environment information from the user via the interface 20 (720).

Here, the environment information refers to information about a space where wireless communication with the sink device 3 is performed. For example, the environment information may include at least one of the number of obstacles located on a wireless communication path to the sink device 3, a distance from the sink device 3, or a direction of an antenna.

The controller 30 may determine a current maximum transmission rate in the wireless communication environment with the sink device 3 based on the obtained communication performance information of the sink device 3 and the environment information (730).

Figure 8:
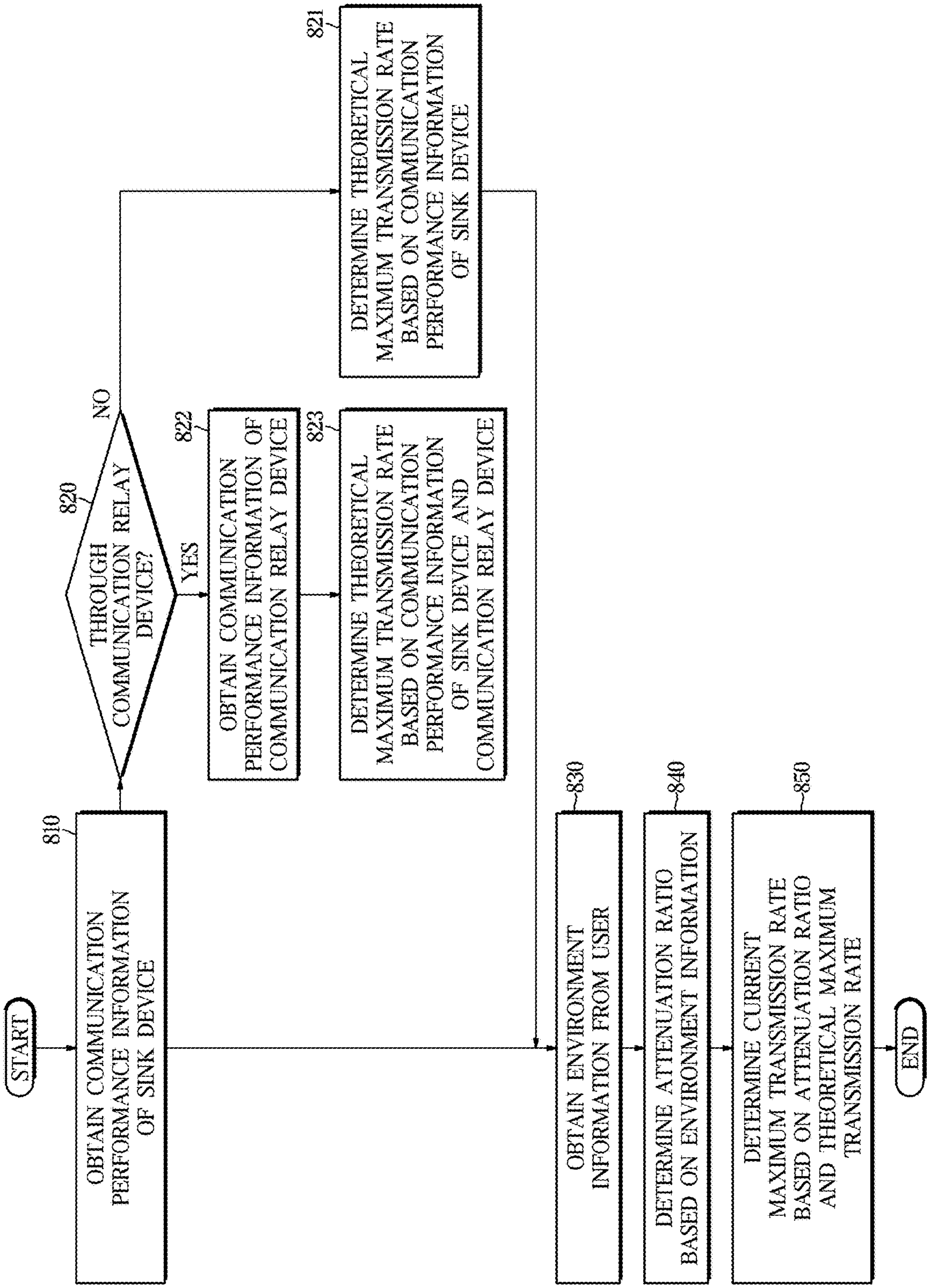
FIG. 8 is a flowchart illustrating a method for determining a current maximum transmission rate according to an embodiment.

FIG. 8 is a flowchart illustrating a method for determining a current maximum transmission rate according to an embodiment.

Referring to FIG. 8, in order to determine a current maximum transmission rate, the controller 30 may determine a theoretical maximum transmission rate.

The controller 30 may obtain communication performance information of the sink device 3 according to the method described above (810).

Thereafter, the controller 30 may confirm whether the wireless communication additionally goes through a communication relay device in addition to the sink device 3 on the wireless communication path (820). In a case where wireless communication is performed independently with the sink device 3 without going through the communication relay device, the theoretical maximum transmission rate may be determined based only on the communication performance information of the sink device 3 (821).

However, in a case of going through the communication relay device, the controller may additionally obtain communication performance information from the communication relay device via the communication circuitry 10 (822). In this case, the controller 30 may determine the theoretical maximum transmission rate based on both the communication performance information of the sink device 3 and the communication performance information of the communication relay device (823).

Determining the theoretical maximum transmission rate is described in detail.

Specifically, the processor 31 may calculate the theoretical maximum transmission rate using a conversion table showing the communication performance information stored in the memory 32 and a corresponding maximum transmission rate.

In a case where the obtained communication performance information is not included in the pre-stored conversion table, the processor 31 may calculate the theoretical maximum transmission rate based on the communication performance information included in the conversion table.

In other words, the theoretical maximum transmission rate is defined as being proportional to the number of antennas and a channel width, and the theoretical maximum transmission rate corresponding to the obtained communication performance information may be calculated by multiplying a theoretical maximum transmission rate corresponding to the communication performance information included in the conversion table by a multiple of the number of antennas and channel width of the obtained communication performance information.

FIG. 9 illustrates an example of a conversion table showing a theoretical maximum transmission rate corresponding to communication performance information.

Referring to FIG. 9, a theoretical maximum transmission rate according to a Wi-Fi protocol and a mode corresponding to the number of antennas and channel width may be determined.

For example, in a case where the controller 30 obtains communication performance information in which the Wi-Fi protocol is 802.11ax and a mode corresponds to the number of antennas of 2×2 and the channel width of 80 MHz, the corresponding theoretical maximum transmission rate may be determined to be 1200 Mbps.

However, in a case where the controller 30 obtains communication performance information of a communication device in which the Wi-Fi protocol is 802.11ax, the number of antennas is 4×4, and the channel width is 80 MHz, the corresponding theoretical maximum transmission rate may not be stated in the conversion table.

In this case, the controller 30 may use 1200 Mbps which is stated in the conversion table, i.e., the theoretical maximum transmission rate corresponding to the communication performance information in which the Wi-Fi protocol is 802.11ax and the mode corresponds to the number of antennas of 2×2 and the channel width of 80 MHz, in order to determine a theoretical maximum transmission rate corresponding to communication performance information not stated in the conversion table.

That is, because the number of antennas is doubled and the channel width is the same, the controller 30 may determine 2400 Mbps as the theoretical maximum transmission rate by multiplying 1200 Mbps by 2.

Meanwhile, in a case where a plurality of communication devices including the sink device 3 exist, the controller 30 may determine a theoretical maximum transmission rate for each communication device according to the method described above.

The controller 30 may determine the lowest of the theoretical maximum transmission rates of each communication device as a theoretical maximum transmission rate in the entire wireless transmission path. Because a section with the lowest transmission rate becomes a bottleneck section, the rate in the entire path may be determined based on the section.

The controller 30 may determine a current maximum transmission rate based on the determined theoretical maximum transmission rate and a current operating environment of wireless communication. That is, the current maximum transmission rate may indicate an actual maximum transmission rate considering the operating environment of wireless transmission.

A difference between the theoretical maximum transmission rate and the current maximum transmission rate may be caused by signal attenuation due to distance or obstacles, or interference due to Wi-Fi bandwidth sharing. Because the interference due to Wi-Fi bandwidth sharing is based on the number of users, which varies over time, the interference due to Wi-Fi bandwidth sharing is not used as a variable, and thus a spatial factor which is the signal attenuation due to distance or obstacles are considered in the disclosure.

Referring again to FIG. 8, the controller 30 may obtain environment information corresponding to a current wireless communication operating environment from a user via the interface 20 (830).

In addition, the controller 30 may determine an attenuation ratio based on the obtained environment information (840). The attenuation ratio refers to a reduction ratio that takes a spatial factor of an actual operating environment of wireless communication into consideration in determining the current maximum transmission rate based on the theoretical maximum transmission rate.

Here, the spatial factor may include the number of obstacles located on a wireless communication path, a distance from the sink device 3, and a direction of an antenna, as described above.

Accordingly, the controller 30 may determine the current maximum transmission rate by applying the attenuation ratio to the determined theoretical maximum transmission rate (850).

FIG. 10 illustrates an example of a maximum transmission rate corresponding to an operating environment of wireless transmission according to an embodiment.

FIG. 10*a* illustrates locations of the gateway apparatus 1 according to an embodiment and the sink devices 3 in a house, and FIG. 10*b* is a graph illustrating an example of change in maximum transmission rate depending on the locations of the sink devices 3.

Referring to FIG. 10*a*, the gateway apparatus 1 is installed in a G area 1001 in a bedroom 1010. The sink devices 3 are located in the bedroom 1010 which is the same place as the G area 1001, a living room 1020 that passes through one door on a wireless transmission path, a bathroom 1030 that passes through two doors on the wireless transmission path, and an entrance 1040 that passes through three doors on the wireless transmission path.

It is assumed that the number of obstacles such as doors on the wireless transmission path and a distance of the wireless transmission path increases as moving from the bedroom 1010, the living room 1020, the bathroom 1030, to the entrance 1040.

Maximum transmission rates corresponding to the location of each of the sink devices 3 are shown in FIG. 10*b*. FIG. 10*b* illustrates a logarithmic function in which an x-axis represents the numbers of FIG. 10*a* indicating the location of each of the sink devices 3, and a y-axis represents a signal strength when the signal transmitted from the gateway apparatus 1 is received by the sink device 3. The stronger the signal received, the higher the maximum transmission rate.

Referring to FIG. 10*b*, in a case where the sink device 3 is located in the bedroom 1010, which is the closest to the gateway apparatus 1, the sink device 3 may have the highest maximum transmission rate 1011.

In addition, it may be confirmed that as the distance from the gateway apparatus 1 increases or the number of obstacles such as doors increases, the maximum transmission rate gradually decreases. Accordingly, it may be confirmed in FIG. 10*b* that the maximum transmission rate decreases in the order of the living room 1020, the bathroom 1030, and the entrance 1040.

As such, in order to derive a current maximum transmission rate considering the above, the controller 30 may determine an attenuation ratio corresponding to an operating environment of wireless transmission. In addition, the controller 30 may determine the current maximum transmission rate by multiplying the determined attenuation ratio by the theoretical maximum transmission rate.

For example, in a case where a plurality of spaces divided by a door or wall exist, an attenuation ratio for use within the space may be determined to be 0.4, and an attenuation ratio for use between spaces divided by a single door or wall may be determined to be 0.2.

Accordingly, referring to FIG. 9, in a case where the Wi-Fi protocol is 802.11ac wave1 and a mode corresponds to the number of antennas of 2×2 and the channel width of 80 MHz, a theoretical maximum transmission rate is 866 Mbps. However, for use within the space, a current maximum transmission rate may be determined to be 346.4 Mbps by applying the attenuation ratio of 0.4, and for use between spaces divided by a single door or wall, a current maximum transmission rate may be determined to be 173.2 Mbps by applying the attenuation ratio of 0.2.

FIG. 11 illustrates an example of a table showing actual measured values of current maximum transmission rate that vary depending on a distance to a sink device and an angle of an antenna in an environment in which wireless communication with the sink device is performed according to an embodiment.

Here, the angle of the antenna refers to an angle formed between directions of the antennas of the sink device 3 and the gateway apparatus 1 that perform communication. For example, 0 degrees indicates that the antennas of both devices are facing each other, 180 degrees indicates that the antennas of both devices are in the same direction, and values in between may indicate that the antennas of both devices are pointing in different directions depending on the angle formed.

Referring to the actual measured values in FIG. 11, it may be seen that an original performance is maintained up to 2 m, the performance increases due to reflected waves at 5 m, and the performance tends to deteriorate at 10 m. In addition, it may be seen that in a case where the angle of the antenna is 90 degrees, the performance tends to deteriorate rapidly.

Accordingly, a conversion table or a look-up table for an attenuation ratio in each operating environment may be generated based on the actual measurement data as shown in FIG. 11, and an attenuation ratio corresponding to an operating environment may be determined using the conversion table.

The attenuation ratios stated above are only examples, and the disclosure is not limited thereto, and any method may be used as long as an attenuation ratio may be determined differently depending on the operating environment.

Hereinafter, a method for determining a transmittable media format based on the determined current maximum transmission rate is described.

The controller 30 may determine a media format that may be transmitted wirelessly among media formats included in EDID of the sink device 3 based on the determined current maximum transmission rate.

Although the media formats included in the EDID may be processed by the sink device 3, media formats that may not be transmitted (hereinafter, also referred to as "non-transmittable media formats") may exist considering the current maximum transmission rate.

Referring again to FIG. 7, the controller 30 may determine a required bitrate for wirelessly transmitting media data of available output formats included in the EDID of the sink device 3 to the sink device 3 (740).

The controller 30 may compare the determined required bitrate with the previously determined current maximum transmission rate (750). In response to the required bitrate being less than or equal to the current maximum transmission rate, a corresponding media format may be determined as a transmittable media format (760). In addition, in response to the required bitrate exceeding the current maximum transmission rate, the controller 30 may determine that a corresponding media format is a non-transmittable media format.

A conversion table that defines a media format and a corresponding bitrate may be used to determine the required bitrate for available media formats included in the EDID of the sink device 3.

That is, the memory 32 may store bitrates required for all media formats that may be processed by the gateway apparatus 1 based on a processing performance of the gateway apparatus 1. In addition, the bitrate may be metadata in the form of the conversion table as described above.

In a case where a media format whose bitrate is not defined in the conversion table exists among the media formats included in the EDID of the sink device 3, the controller 30 may determine the bitrate by calculation considering a performance difference such as a frame size, a frame rate, and the like, based on the media formats defined in the conversion table.

For example, a bitrate may be determined by reflecting a ratio of frame size as is in the bitrate, reflecting a ratio of frame rate as 2:1.3, and reflecting the H.264 codec twice compared to the HEVC codec.

FIG. 12 illustrates an example of a conversion table defining a bitrate required to transmit a media format.

In FIG. 12, Video Identification Code (VIC) refers to code information indexing a video format of CTA-864-H which is an extended standard of EDID. Referring to FIG. 12, a bitrate for each VIC may be confirmed.

Referring to FIG. 12, it may be confirmed that the bitrate of VIC 16 corresponding to 1920x1080p and 60 Hz HEVC is 15 Mbps. In this case, the bitrate corresponding to 60 Hz HEVC and 3840x2160p where the frame size is 4 times may be determined to be 60 Mbps by applying 4 times the bitrate.

Also, the bitrate corresponding to 3840x2160p and 120 Hz HEVC may be determined to be 78 Mbps by applying 1.3 times to the bitrate corresponding to 3840x2160p and 60 Hz HEVC, because the frame rate is twice as large.

In addition, the bitrate corresponding to 7680x4320p and 60 Hz H.264 has 4 times the frame size of 3840×2160p and 60 Hz HEVC, and because it is an H.264 codec, the bitrate corresponding to 7680x4320p and 60 Hz H.264 may be determined to be 480 Mbps by applying 2 times more, for a total of 8 times.

In this case, in the above example, in a case where the Wi-Fi protocol is 802.11ac wave1, a mode corresponds to the number of antennas of 2×2 and the channel width of 80 MHz, and for use between spaces divided by a single door or wall, a current maximum transmission rate may be determined to be 173.2 Mbps by applying an attenuation ratio of 0.2. In this case, a media format requiring a bitrate exceeding 173.2 Mbps may be determined as a non-transmittable media format. Thus, a media format corresponding to 7680x4320p and 60 Hz H.264, whose bitrate is 480 Mbps, or the VIC 199 in FIG. 12 whose bitrate is 240 Mbps, may be determined as a non-transmittable media format.

Although among media formats, a video format is used in the above example, a bitrate required for audio format may also be determined in the same manner as above. In general, in the case of audio format, the amount of data is relatively small compared to a video format and is transmitted wirelessly as is, but multi-channel audio and professional audio formats may require a bitrate equivalent to that of video format.

Meanwhile, the controller 30 may determine a non-transmittable media format based on a performance of the gateway apparatus 1, which may be required in a case where the gateway apparatus 1 is old or a dongle form factor developed with limited performance.

In a case where the gateway apparatus 1 itself has a limited required bitrate for a media format that may be processed, a bottleneck may occur in the gateway apparatus 1, and thus the controller 30 may determine the non-transmittable media format based on the performance of the gateway apparatus 1.

Accordingly, the controller 30 may determine that a media format that requires a bitrate greater than the largest value among the required bitrates for media formats that may be processed by the gateway apparatus 1 is a non-transmittable media format.

Thereafter, the controller 30 may modify stored EDID based on the determined transmittable media format (770), and may transmit the modified EDID to the selected source device 2 via the communication circuitry 10 (780).

The processor 31 may delete the non-transmittable media format from the EDID among the media formats included in the EDID of the sink device 3, may store in the memory 32, and may transmit to the selected source device 2 via the communication circuitry 10.

Specifically, in the case of video format, the processor 31 may delete a VIC code that may not be transmitted from among VIC codes included in the existing stored EDID, and may transmit to the source device 2.

Referring to FIG. 2, the third stage is to process and transmit the media data (230).

The controller 30 of the gateway apparatus 1 according to an embodiment may receive the media data from the source device 2 via the communication circuitry 10 (231).

The media data provided from the source device 2 may be processed by rendering and encoding with specifications corresponding to the performance information of the sink device 3.

Rendering is a type of data processing method for converting data of three-dimensional modeled objects into two-dimensional (2D) image data. That is, the source device 2 according to the disclosure may perform rendering to generate media data that may be played back in the sink device 3.

Encoding refers to a type of data processing method for converting a capacity or format of data. That is, the source device 2 according to the disclosure may convert the media data generated through the above-described rendering process into appropriate specifications based on the performance information of the sink device 3.

Accordingly, in a case where media data is generated in the source device 2, rendering and encoding processes are performed. It may be understood that the rendering process described herein may include encoding process.

That is, at least one source device 2 may determine the specifications of the media data to be transmitted to the gateway apparatus 1 based on the received performance information of the sink device 3, and may render the data with the corresponding specifications to generate the media data to be provided to the gateway apparatus 1.

As a result, as opposed to an existing method that may transmit only data of limited predetermined specifications regardless of output specifications of a sink device, media data optimized for the performance of the sink device 3 may be provided to the source device 2, thereby allowing a user to experience high-quality media on the sink device 3.

Thereafter, the controller 30 may perform data conversion on the media data to wirelessly transmit the media data to the sink device 3 (232). The media data that undergoes data conversion refers to media data corresponding to the performance information of the sink device 3 obtained from the source device 2.

That is, the controller 30 may perform reformatting to convert the vast amount of RAW data transmitted from the source device 2 into a transmission amount appropriate for a band state based on wireless network band information.

Reformatting refers to data processing to change data from its existing format to another format as required. That is, the controller 30 may perform data reformatting to change the media data into a data format with the appropriate transmission amount for wireless transmission of the media data.

Reformatting may include downsampling and compression processes to wirelessly transmit the media data to the sink device in a limited wireless band situation.

Here, downsampling is a type of data processing method to reduce the amount of data transmission, in a case where a large amount of data may not be transmitted at once due to limitations in transmission rate. Downsampling may include reducing a size, a frame rate, a sampling ratio, and the like, to reduce the amount of data transmission.

Also, during the data compression process, the controller 30 may re-encode the media data to match the data amount of wireless transmission.

In addition, the controller 30 may perform packetization to transmit the reformatted data wirelessly.

Packetization is a type of data processing method to divide data into packets, which are a basic unit through which data may be transmitted, for data transmission. Accordingly, after data is received, a process of reassembling the data into its original form may be performed. A size of packet may vary depending on a network bandwidth and standardized protocol.

Packetization may include multi-plexing of video, audio, and metadata to output video or audio from the sink device 3.

Multi-plexing refers to a method of combining multiple independent signals into one signal and transmitting the signal through a common communication path. In the disclosure, multi-plexing refers to transmitting audio data, video data, metadata, and the like, into one data stream.

Multi-plexing may include Time-Division Multiplexing (TDM), Frequency-Division Multiplexing (FDM), Code-Division Multiplexing (CDM), and the like.

The controller 30 may transmit the media data that has undergone the above-described conversion processes to the sink device 3 via the communication circuitry 10 (233).

Accordingly, the sink device 3 may output the transmitted media data with optimized specifications.

Figure 13:
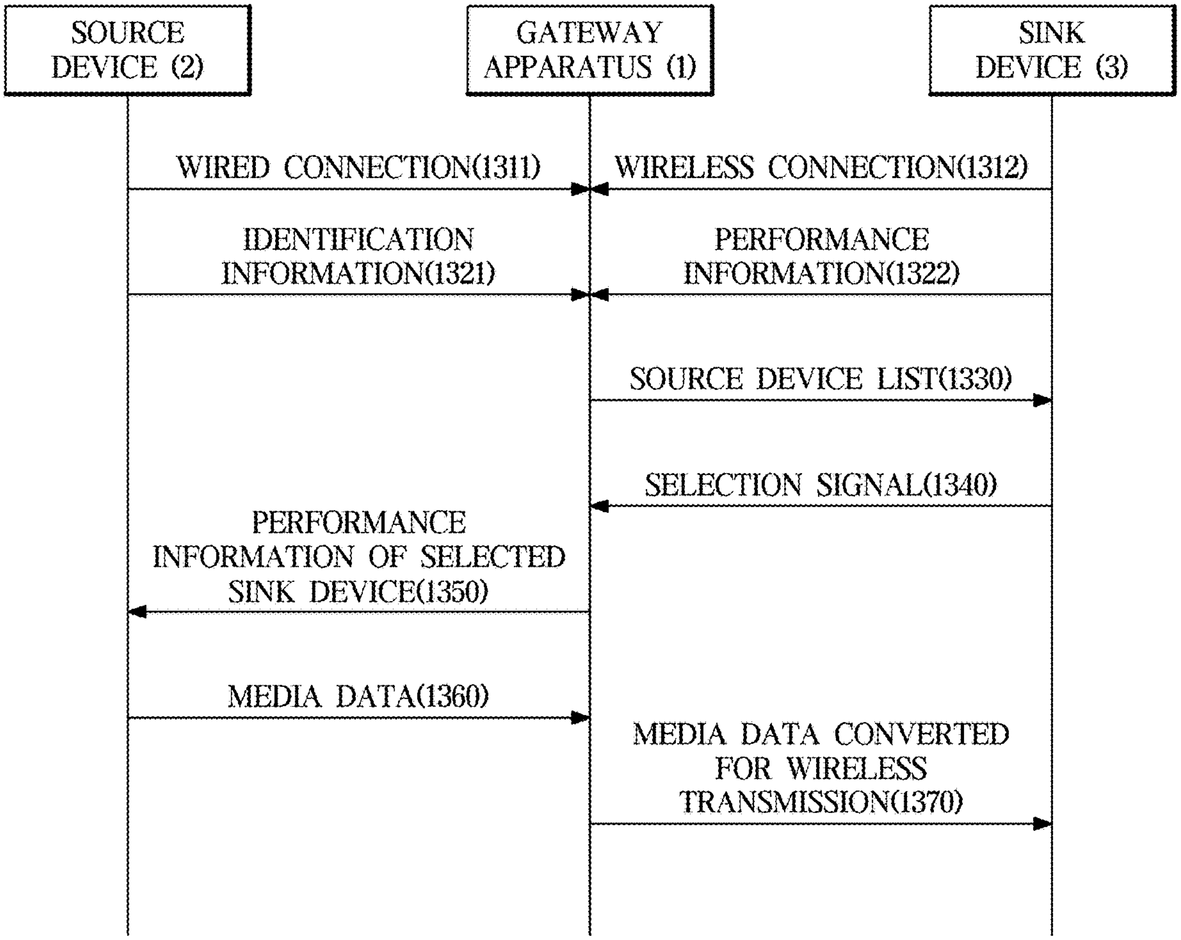
FIG. 13 is a flowchart illustrating a handshaking system according to an embodiment.

FIG. 13 is a flowchart illustrating a handshaking system according to an embodiment.

Referring to FIG. 13, a handshaking system according to an embodiment may include the source device 2 that provides media data, the sink device 3 that outputs at least one of video or audio based on the media data, and the gateway apparatus 1 that is wirelessly connected to the sink device 3 and connected by wire to the source device 2.

In order to perform handshaking on the system, an initial connection process is required, i.e., a user is required to first connect the source device 2 to the gateway apparatus 1 by wire (1311), and wirelessly connect the sink device 3 to the gateway apparatus 1 (1312). Here, a plurality of source devices 2 and a plurality of sink devices 3 may be connected.

Thereafter, the user may select a source device 2 to provide media data and a sink device 3 to output media. Selecting the source device 2 and selecting the sink device 3 may be performed independently.

First, the gateway apparatus 1 may receive identification information of the source device 2 from the source device 2 connected by wire (1321). In addition, the gateway apparatus 1 may receive performance information of the sink device 3 from the wirelessly connected sink device 3 (1322).

In addition, the gateway apparatus 1 may store the received performance information of the sink device 3 in the memory 32.

Thereafter, the user may select the source device 2 and the sink device 3. The user's selection may be input through the interface 20 of the gateway apparatus 1 or through the user interface of the sink device 3.

In response to a selection signal of the user being input through the interface 20 of the gateway apparatus 1, the gateway apparatus 1 may generate a list of source devices 2 based on the identification information and may store the list in the memory 32. Also, the gateway apparatus 1 may generate a list of sink devices 3 based on the performance information and may store the list in the memory 32.

In addition, the list of source devices 2 and the list of sink devices 3 may be output to the interface 20. Based on the output list information, the user may input a selection signal for the source device 2 and the sink device 3 to the gateway apparatus 1 through the interface 20.

As described above, in a case where the user's selection signal is input through the interface 20 of the gateway apparatus 1, generating and transmitting the list of source devices 2 to the sink device 3 and receiving a user's selection signal through the user interface of the sink device 3, which will be described later, may not be required.

In a case where the user's selection signal is input through the user interface of the sink device 3, the gateway apparatus 1 may generate the list of the source devices 2 based on the identification information and store the list in the memory 32, and may transmit to the sink device 3 (1330).

The sink device 3 may output the list of source devices 2 to allow the user to recognize the list, and the user may select the source device 2 to provide the media data based on the output list of source devices 2.

The output of the sink device 3 may provide information about the source device 2 to allow the user to select at least one source device 2 to provide the media data to the sink device 3.

Accordingly, the user may select at least one source device 2 through the user interface of the sink device 3, and the sink device 3 may transmit the selection signal for the source device 2 to the gateway apparatus 1 (1340).

The gateway apparatus 1 may transmit, to the selected source device 2, performance information of the sink device 3 that transmits the selection signal based on the selection signal (1350). Here, the performance information may include EDID, and the EDID may include EDID modified into a transmittable format as described above.

The source device 2 may perform rendering on the media data with specifications corresponding to the received performance information of the sink device 3, and may transmit the rendered media data to the gateway apparatus 1 (1360).

The gateway apparatus 1 may perform data conversion on the media data corresponding to the performance information of the sink device 3 in order to wirelessly transmit the media data received from the source device 2 to the sink device 3. Data conversion may include reformatting that includes downsampling and compression based on wireless network band information. In addition, packetization of the reformatted media data may be additionally performed for wireless transmission.

The media data converted for wireless transmission in the gateway apparatus 1 may be transmitted to the sink device 3 (1370). The sink device 3 may output media based on the transmitted media data.

The above description includes both a case where a single source device 2 and a single sink device 3 are selected by the user and a case where a plurality of source devices 2 and a plurality of sink devices 3 are selected by the user. The following describes each handshaking scenario depending on the number of source devices 2 and sink devices 3 selected by a user.

Figure 14:
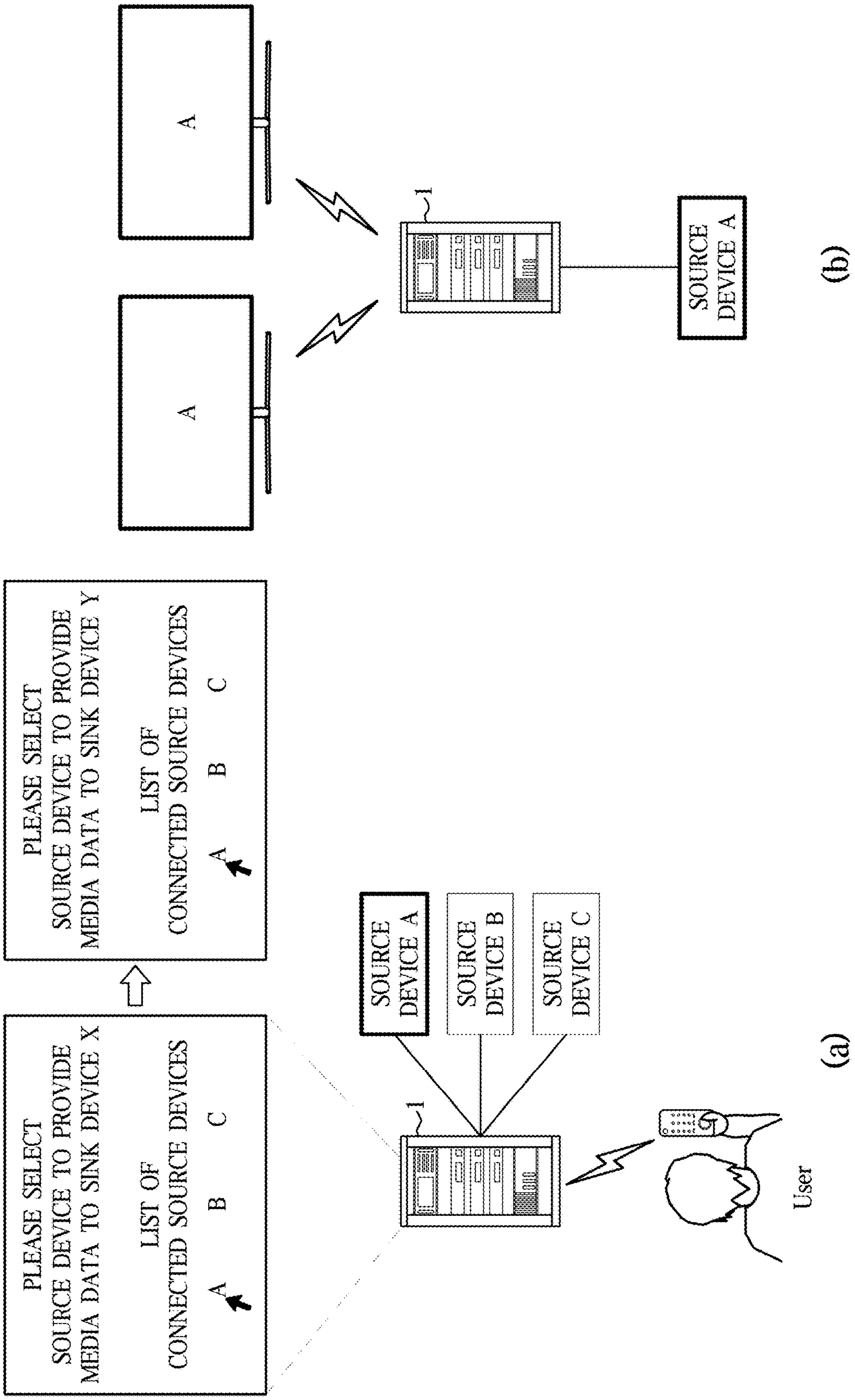
FIG. 14 illustrates an example of a handshaking scenario in a case where a single source device and a plurality of sink devices are selected according to an embodiment.

FIG. 14 illustrates an example of a handshaking scenario in a case where a single source device and a plurality of sink devices are selected.

FIG. 14 may be a case where source device list information and sink device list information are output to the interface 20 of the gateway apparatus 1, and a user selects only one source device 2 from at least one source device 2, and selects a plurality of sink devices 3.

Alternatively, FIG. 14 may be a case where the source device list information is output to the user interfaces of a plurality of sink devices 3, and the user selects the same source device 2 through all of the sink devices 3.

For example, referring to FIG. 14*a*, a user may select a plurality of sink devices and a single source device from among sink devices X and Y and source devices A, B, and C through the interface 20 of the gateway apparatus 1.

In response to the user's selection of the sink device X through a manual provided by the interface 20 as shown in FIG. 5, the interface 20 may provide a manual for selecting the source device 2. Accordingly, the user may select the source device A to provide media data to the sink device X through the manual provided by the interface 20.

Next, in response to the user's selection of the sink device Y through the manual provided by the interface 20 as shown in FIG. 5, the interface 20 may also provide the manual for selecting the source device 2. Accordingly, the user may also select the source device A to provide the media data to the sink device Y.

In this case, the source device A may receive performance information of both the sink devices X and Y from the gateway apparatus 1.

In addition, as shown in FIG. 14*b*, because the source device 2 to provide the media data is the source device A in both cases, video and audio output from the sink devices X and Y selected by the user are the same.

However, specifications of the media data transmitted to the gateway apparatus 1 may vary depending on the performance information of each of the sink devices 3.

Accordingly, the source device 2 may render the media data with specifications corresponding to the performance information of each of the sink devices 3, and may transmit the media data rendered differently for each of the sink devices 3 to each of the sink devices 3 through the gateway apparatus 1.

That is, in a scenario of FIG. 14*a*, the source device A may render the same media data with specifications corresponding to the performance information of the sink device X, and may render the media data with specifications corresponding to the performance information of the sink device Y again, thereby generating a plurality of rendered media data.

Finally, the gateway apparatus 1 may convert the media data rendered for each of the sink devices 3 based on wireless network band information to wirelessly transmit to each of the sink devices 3.

Figure 15:
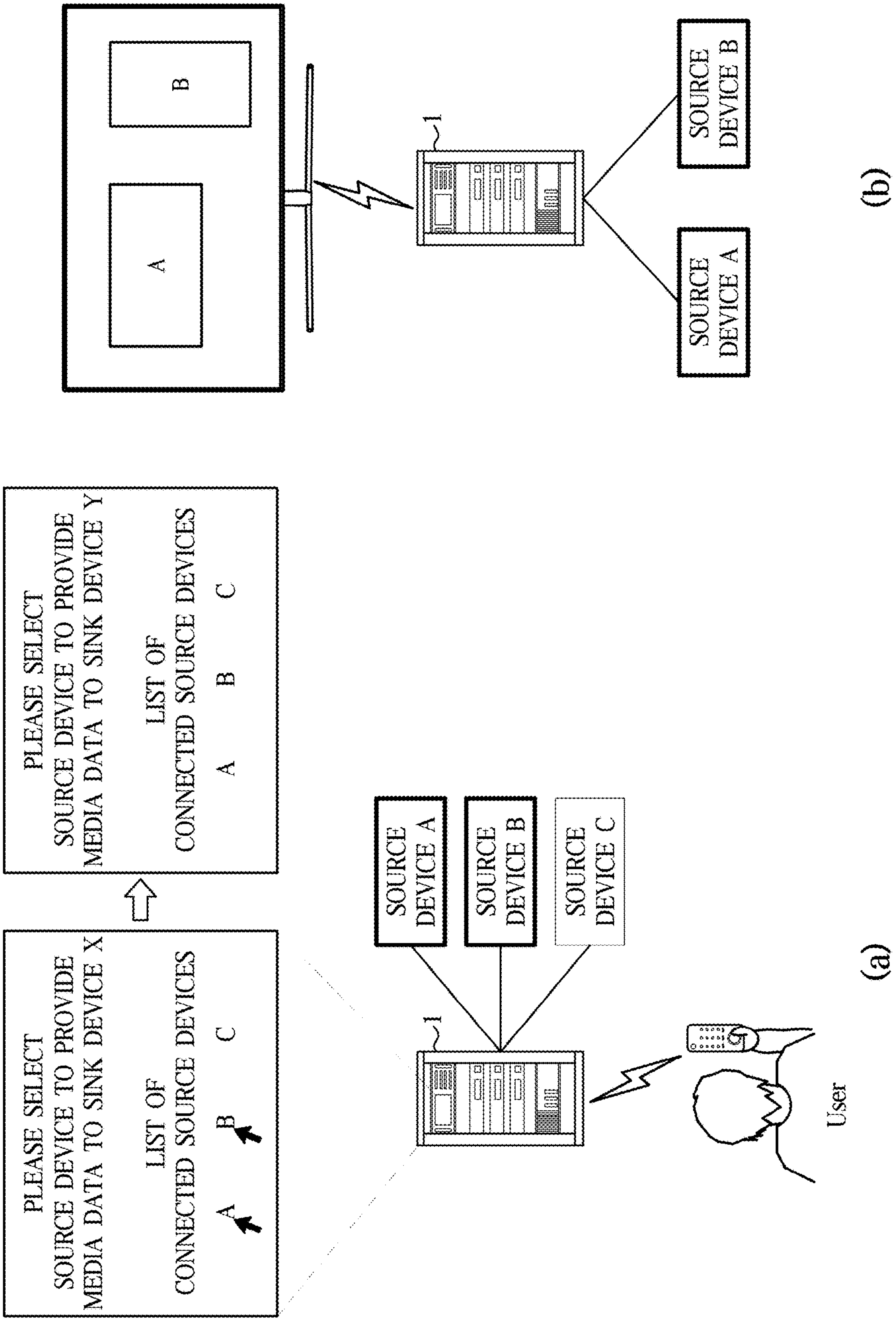
FIG. 15 illustrates an example of a handshaking scenario in a case where a plurality of source devices are provided and a single sink device is selected according to an embodiment.

FIG. 15 illustrates an example of a handshaking scenario in a case where a plurality of source devices are provided and a single sink device is selected.

FIG. 15 may be a case where source device list information and sink device list information are output to the interface 20 of the gateway apparatus 1, and a user selects a plurality of source devices 2 from among at least one source device 2, and selects a single sink device 3.

Alternatively, FIG. 15 may be a case where source device list information is output to the user interface of at least one sink device 3 and the user selects the source device 2 through only one sink device 3.

For example, referring to FIG. 15*a*, a user may select a single sink device and a plurality of source devices from among sink devices X and Y and source devices A, B, and C through the interface 20 of the gateway apparatus 1.

In response to the user's selection of the sink device X through a manual provided by the interface 20 as shown in FIG. 5, the interface 20 may provide a manual for selecting the source device 2. The user may select the source devices A and B to provide media data to the sink device X through the manual provided by the interface 20.

Thereafter, in response to the user's selection of the sink device Y through the manual provided by the interface 20, the interface 20 may also provide the manual for selecting the source device 2. The user may not select a source device to provide the media data to the sink device Y through the manual provided by the interface 20.

Alternatively, in a case where the user does not select the sink device Y in the first place, the interface 20 of the gateway apparatus 1 does not provide the manual for selecting the source device 2, and thus the media data is not provided to the sink device Y.

In this case, the gateway apparatus 1 may transmit performance information of the sink device X to the source devices A and B. Because only one piece of performance information is transmitted, the quality of media that may be output from the sink device X selected by the user may be the same even though the source device 2 is different. In addition, specifications of the media data transmitted to the gateway apparatus 1 correspond to the performance information of the sink device 3, and thus the specifications of the media data may be the same even though the source device 2 is different.

However, the types of media data provided from the plurality of source devices 2 may be different. Accordingly, video and audio output from a single sink device 3 may be different for each source device.

Each of the source devices 2 may render the media data with specifications corresponding to the performance information of the sink device 3, and may transmit the media data to the gateway apparatus 1.

The gateway apparatus 1 may convert the media data rendered by each of the source devices 2 based on wireless network band information to wirelessly transmit to the sink device 3.

Meanwhile, in a case where the media data provided by each of the source devices 2 is different from each other, the sink device 3 may perform a multi-view function.

The multi-view function refers to a function that may play multiple videos simultaneously by dividing a screen of the sink device 3.

Referring to FIG. 15*b*, the sink device X may receive the media data rendered by the sources devices A and B from the gateway apparatus 1, and may use the multi-view function to simultaneously output the media data.

Figure 16:
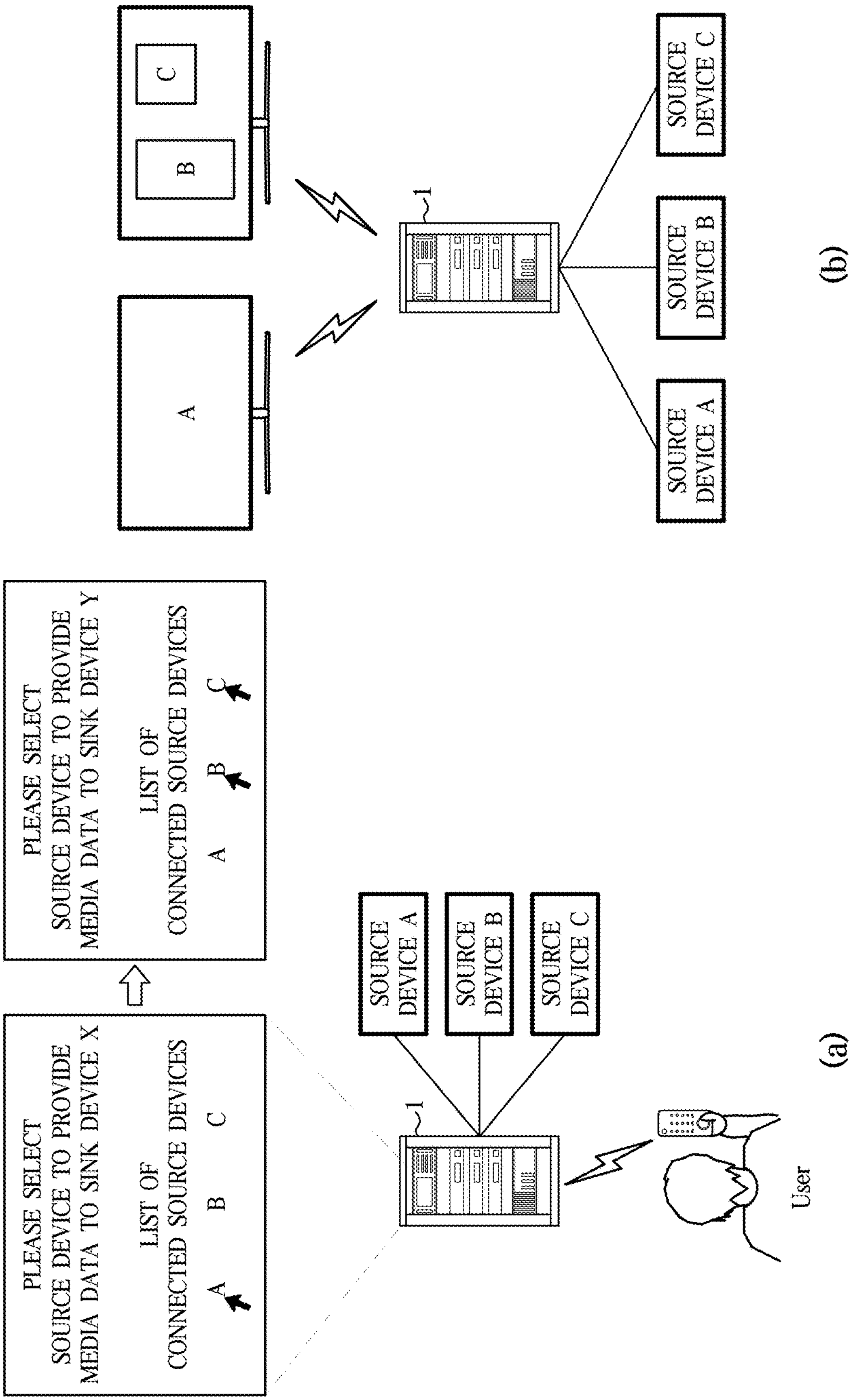
FIG. 16 illustrates an example of a handshaking scenario in a case where a plurality of source devices and a plurality of sink devices are provided according to an embodiment.

FIG. 16 illustrates an example of a handshaking scenario in a case where a plurality of source devices and a plurality of sink devices are provided.

FIG. 16 may be a case where source device list information and sink device list information are output to the interface 20 of the gateway apparatus 1, and a user selects a plurality of source devices 2 and a plurality of sink devices 3.

As such, in selecting a plurality of sink devices 3 and a plurality of source devices 2 through the interface 20 of the gateway apparatus 1, the user may select the source devices 2 to provide media data to each of the sink devices 3 by considering the type of media to be output from each of the sink devices 3.

In response to the user's selection of the plurality of sink devices 3 through the interface 20 of the gateway apparatus 1, the gateway apparatus 1 may provide a manual for allowing the user to select the source device 2 for each of the sink devices 3 through the interface 20.

Alternatively, FIG. 16 may be a case where source device list information is output to the user interfaces of the plurality of sink devices 3, and the user selects a plurality of source devices 2 through a plurality of sink devices 3.

For example, it is illustrated in FIG. 16*a* that that the user selects a plurality of sink devices and a plurality of source devices from among sink devices X and Y and source devices A, B, and C.

In response to the user's selection of the sink device X through a manual provided by the interface 20 as shown in FIG. 5, the interface 20 may provide a manual for selecting the source device 2. The user may select the source device A to provide media data to the sink device X through the manual provided by the interface 20.

Thereafter, in response to the user's selection of the sink device Y through the manual provided by the interface 20, the interface 20 may provide the manual for selecting the source device 2. The user may select the source devices B and C to provide the media data to the sink device Y through the manual provided by the interface 20.

As such, in a case where the user selects the plurality of source devices 2 through the plurality of sink devices 3, the user may select the source devices 2 by considering the type of media to be output from each of the sink devices 3.

In this case, the gateway apparatus 1 may transmit performance information of the sink device X to the source device A and may transmit performance information of the sink device Y to the source devices B and C. Accordingly, specifications of media data transmitted to the gateway apparatus 1 may vary depending on the received performance information.

In addition, because the source devices 2 that provide the media data for outputting the media from each of the sink devices 3 are different from each other, output video or audio may also be different for each of the sink devices 3.

Each of the source devices 2 may render the media data with specifications corresponding to the performance information of the sink device 3 that receives the media data through the gateway apparatus 1, and may transmit to the gateway apparatus 1.

The gateway apparatus 1 may convert the rendered media data again based on wireless network band information, in order to wirelessly transmit the media data rendered by each of the source devices 2 to each of the sink devices 3.

The gateway apparatus 1 may transmit the media data converted and rendered by each of the source devices 2 to each of the sink devices 3 selected by the user.

In a case where the media data provided by each of the source devices 2 is different from each other, the sink device 3 may perform a multi-view function. The multi-view function refers to a function that may play multiple videos simultaneously by dividing a screen of the sink device 3.

Referring to FIG. 16, the sink device X may receive the media data rendered by the source device A from the gateway apparatus 1, and at the same time, the sink device Y may receive the media data rendered by the source devices B and C from the gateway apparatus 1.

Accordingly, because the sink device Y receives different media data generated by the source devices B and C through the gateway apparatus 1, the multi-view function may be used for simultaneous output, like the scenario described in FIG. 12.

According to an embodiment, a gateway apparatus 1 may include: a communication circuitry configured to perform a wired connection with a source device 2 and wirelessly connect with a sink device 3 that outputs media; an interface 20 configured to receive a user input from a user or output information to the user; and a controller 30 configured to control the communication circuitry 10 and the interface 20, wherein the controller 30 may be configured to: obtain communication performance information and Extended Display Identification Data (EDID) including available output formats of the sink device 3 from the sink device 3 via the communication circuitry 10, obtain environment information about a space where wireless communication with the sink device 3 is performed from the user via the interface 20, determine a current maximum transmission rate based on the obtained communication performance information of the sink device 3 and the obtained environment information, determine a required bitrate for wirelessly transmitting media data of the available output formats obtained to the sink device 3, and determine a non-transmittable format among the available output formats, based on the determined required bitrate and the current maximum transmission rate.

In addition, the controller 30 may be configured to determine the non-transmittable format based on the determined required bitrate being greater than the current maximum transmission rate.

In addition, the controller 30 may be configured to generate modified EDID in which the non-transmittable format is deleted from the obtained EDID of the sink device 3, and transmit the modified EDID to the source device 2.

In addition, the controller 30 may be configured to determine a theoretical maximum transmission rate based on the obtained communication performance information of the sink device 3.

In addition, the controller 30 may be configured to determine an attenuation ratio based on the environment information, and determine the current maximum transmission rate based on the determined theoretical maximum transmission rate and the determined attenuation ratio.

In addition, the environment information may include at least one of a number of obstacles located on a path to the sink device 3, a distance from the sink device 3, or a direction of an antenna.

In addition, the controller 30 may be configured to determine a transmittable format among the available output formats, based on the determined required bitrate being equal to or less than a maximum bitrate processable by the gateway apparatus 1.

In addition, the controller 30 may be configured to obtain media data corresponding to the modified EDID from the source device 2 via the communication circuitry 10.

In addition, the controller 30 may be configured to convert the obtained media data to wirelessly transmit the obtained media data to the sink device 3, and transmit the converted media data to the sink device 3 via the communication circuitry 10.

In addition, the controller 30 may be configured to further obtain communication performance information of a communication relay device from the communication relay device via the communication circuitry 10, in a case where the wireless communication with the sink device 3 is through the communication relay device; and determine the theoretical maximum transmission rate based on the communication performance information of the sink device 3 and the communication performance information of the communication relay device.

According to an embodiment of the disclosure, a method for controlling a gateway apparatus 1 may include: performing a wired connection with a source device 2 via a communication circuitry 10, and wirelessly connecting with a sink device 3 that outputs media; obtaining communication performance information and Extended Display Identification Data (EDID) including available output formats of the sink device 3 from the sink device 3 via the communication circuitry 10; obtaining environment information about a space where wireless communication with the sink device 3 is performed from a user via an interface 20; determining a current maximum transmission rate based on the obtained communication performance information of the sink device 3 and the obtained environment information; determining a required bitrate for wirelessly transmitting media data of the available output formats obtained to the sink device 3; and determining a non-transmittable format among the available output formats, based on the determined required bitrate and the current maximum transmission rate.

In addition, the determining of the non-transmittable format may include determining the non-transmittable format, based on the determined required bitrate being greater than the current maximum transmission rate.

In addition, the method may further include: generating modified EDID in which the non-transmittable format is deleted from the obtained EDID of the sink device 3; and transmitting the modified EDID to the source device 2.

In addition, the determining of the current maximum transmission rate may include determining a theoretical maximum transmission rate based on the obtained communication performance information of the sink device 3.

In addition, the determining of the current maximum transmission rate may include: determining an attenuation ratio based on the environment information; and determining the current maximum transmission rate based on the determined theoretical maximum transmission rate and the determined attenuation ratio.

In addition, the environment information may include at least one of a number of obstacles located on a path to the sink device 3, a distance from the sink device 3, or a direction of an antenna.

In addition, the determining of the non-transmittable format may include determining the non-transmittable format among the available output formats, based on the determined required bitrate being equal to or greater than a maximum bitrate processable by the gateway apparatus 1.

In addition, the method may further include obtaining media data corresponding to the modified EDID from the source device 2 via the communication circuitry 10.

In addition, the method may further include: converting the obtained media data to wirelessly transmit the obtained media data to the sink device 3; and transmitting the converted media data to the sink device 3 via the communication circuitry 10.

In addition, the determining of the theoretical maximum transmission rate may include: further obtaining communication performance information of a communication relay device from the communication relay device via the communication circuitry 10, in a case where the wireless communication with the sink device 3 is through the communication relay device; and determining the theoretical maximum transmission rate based on the communication performance information of the sink device 3 and the communication performance information of the communication relay device.

According to an embodiment of the disclosure, a handshaking system may include: a source device 2; a sink device 3 configured to output media; and a gateway apparatus 1 configured to be connected with the source device 2 by wire and be connected with the sink device 3 wirelessly, wherein the gateway apparatus 1 may be configured to: obtain communication performance information and Extended Display Identification Data (EDID) including available output formats of the sink device 3 from the sink device 3, obtain environment information about a space where wireless communication with the sink device 3 is performed from a user via an interface 20, determine a current maximum transmission rate based on the obtained communication performance information of the sink device 3 and the obtained environment information, determine a required bitrate for wirelessly transmitting media data of the available output formats obtained to the sink device 3, and determine a non-transmittable format among the available output formats, based on the determined required bitrate being greater than the current maximum transmission rate.

According to the disclosure, a gateway apparatus, a method for controlling the gateway apparatus, and a handshaking system may provide media data that is converted to be output as optimal audio or video in a sink device, thereby allowing a user to have a high-quality media listening and viewing experience.

The disclosed embodiments may be implemented in the form of a recording medium that stores instructions executable by a computer. The instructions may be stored in the form of program codes, and when executed by a processor, the instructions may create a program module to perform operations of the disclosed embodiments.

The machine-readable storage medium may be provided in the form of a non-transitory storage medium. Here, when a storage medium is referred to as “non-transitory”, it may be understood that the storage medium is tangible and does not include a signal (e.g., an electromagnetic wave), but rather that data is semi-permanently or temporarily stored in the storage medium. For example, a "non-transitory storage medium" may include a buffer in which data is temporarily stored.

According to an embodiment, the method according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed (e.g., download or upload) through an application store (e.g., Play Store™) online or directly between two user devices (e.g., smartphones). In the case of online distribution, at least a portion of the computer program product (e.g., downloadable app) may be stored at least semi-permanently or may be temporarily generated in a storage medium, such as a memory of a server of a manufacturer, a server of an application store, or a relay server.

The effects that may achieved by the disclosure are not limited to the above-mentioned effects, and other effects not mentioned will be clearly understood by one of ordinary skill in the technical art to which the disclosure belongs from the following description.

Although disclosure has been shown and described in relation to specific embodiments, it would be appreciated by those skilled in the art that changes and modifications may be made in these embodiments without departing from the principles and scope of the disclosure, the scope of which is defined in the claims and their equivalents.

What is claimed is:

1. A gateway apparatus, comprising:

a communication circuitry configured to perform a wired connection with a source device and wirelessly connect with a sink device that outputs media;

an interface configured to receive a user input from a user or output information to the user; and a controller configured to control the communication circuitry and the interface to:

obtain communication performance information of the sink device, and obtain Extended Display Identification Data (EDID) including available output formats of the sink device from the sink device via the communication circuitry, obtain information about an environment in which wireless communication with the sink device is performed from the user via the interface, determine a current maximum transmission rate of the wireless communication with the sink device based on the obtained communication performance information of the sink device and the obtained information about the environment in which wireless communication with the sink device is performed, determine a bitrate required to wirelessly transmit data associated with the media in the available output formats included in the EDID to the sink device for output of the media by the sink device, and determine a non-transmittable format among the available output formats, based on the determined bitrate required and the current maximum transmission rate.

2. The gateway apparatus of claim 1, wherein the controller is configured to determine the non-transmittable format based on the determined bitrate being greater than the current maximum transmission rate.

3. The gateway apparatus of claim 2, wherein the controller is configured to:

generate modified EDID in which the non-transmittable format is deleted from the EDID of the sink device, and transmit the modified EDID to the source device.

4. The gateway apparatus of claim 1, wherein the controller is configured to determine a theoretical maximum transmission rate based on the obtained communication performance information of the sink device.

5. The gateway apparatus of claim 4, wherein the controller is configured to:

determine an attenuation ratio based on the information about the environment in which wireless communication with the sink device is performed, and determine the current maximum transmission rate based on the determined theoretical maximum transmission rate and the determined attenuation ratio.

6. The gateway apparatus of claim 5, wherein the information about the environment in which wireless communication with the sink device is performed includes at least one of a number of obstacles located on a path to the sink device, a distance from the sink device, or a direction of an antenna.

7. The gateway apparatus of claim 1, wherein the controller is configured to determine a transmittable format among the available output formats, based on the determined bitrate being equal to or less than a maximum bitrate processable by the gateway apparatus.

8. The gateway apparatus of claim 3, wherein the controller is configured to obtain a respective media data corresponding to the modified EDID from the source device via the communication circuitry.

9. The gateway apparatus of claim 8, wherein the controller is configured to:

convert the obtained respective media data to wirelessly transmit to the sink device, and transmit the converted respective media data to the sink device via the communication circuitry.

10. The gateway apparatus of claim 4, wherein the controller is configured to:

obtain communication performance information of a communication relay device from the communication relay device via the communication circuitry, based on the wireless communication with the sink device being through the communication relay device; and determine the theoretical maximum transmission rate based on the communication performance information of the sink device and the communication performance information of the communication relay device.

11. A method for controlling a gateway apparatus, the method comprising:

performing a wired connection with a source device via a communication circuitry, and wirelessly connecting with a sink device that outputs media;

obtaining communication performance information of the sing device, and obtaining Extended Display Identification Data (EDID) including available output formats of the sink device from the sink device via the communication circuitry;

obtaining information about an environment in which wireless communication with the sink device is performed from a user via an interface;

determining a current maximum transmission rate of the wireless communication with the sink device based on the obtained communication performance information of the sink device and the obtained information about the environment in which wireless communication with the sink device is performed;

determining a bitrate required to wirelessly transmit data associated with the media in the available output formats included in the EDID to the sink device for output of the media by the sink device; and determining a non-transmittable format among the available output formats, based on the determined bitrate required and the current maximum transmission rate.

12. The method of claim 11, wherein the determining of the non-transmittable format comprises determining the non-transmittable format, based on the determined bitrate being greater than the current maximum transmission rate.

13. The method of claim 12, further comprising:

generating modified EDID in which the non-transmittable format is deleted from the EDID of the sink device; and transmitting the modified EDID to the source device.

14. The method of claim 11, wherein the determining of the current maximum transmission rate comprises determining a theoretical maximum transmission rate based on the obtained communication performance information of the sink device.

15. The method of claim 14, wherein the determining of the current maximum transmission rate comprises:

determining an attenuation ratio based on the information about the environment in which wireless communication with the sink device is performed; and determining the current maximum transmission rate based on the determined theoretical maximum transmission rate and the determined attenuation ratio.

* * * * *